United States Patent
De Raeve et al.

(10) Patent No.: US 12,320,320 B2
(45) Date of Patent: Jun. 3, 2025

(54) ENERGY STORAGE SYSTEM

(71) Applicant: Sulzer Management AG, Winterthur (CH)

(72) Inventors: Karel De Raeve, Winterthur (CH); Thomas Welschinger, Radolfzell (DE); Bartosz Kus, Winterthur (CH)

(73) Assignee: Sulzer Management AG, Winterthur (CH)

( * ) Notice: Subject to any disclaimer, the term of this patent is extended or adjusted under 35 U.S.C. 154(b) by 0 days.

(21) Appl. No.: 18/084,204

(22) Filed: Dec. 19, 2022

(65) Prior Publication Data
US 2023/0193932 A1 Jun. 22, 2023

(30) Foreign Application Priority Data
Dec. 20, 2021 (EP) .................................... 21216018

(51) Int. Cl.
*F03B 13/00* (2006.01)
*F03B 13/06* (2006.01)

(52) U.S. Cl.
CPC .................................. *F03B 13/06* (2013.01)

(58) Field of Classification Search
CPC . F15B 13/06; F15B 1/04; F03B 13/06; H02K 7/09; H02K 7/1823; H02K 49/108; F05B 2220/706; F05B 2240/51; F05B 2240/97; F05B 2260/422; F05B 2240/95; Y02E 60/16
See application file for complete search history.

(56) References Cited

U.S. PATENT DOCUMENTS

| | | | | |
|---|---|---|---|---|
| 8,456,031 B1 * | 6/2013 | Hull | ........................ | F03B 17/02 290/43 |
| 2015/0361948 A1 | 12/2015 | Schmidt-Boecking et al. | | |

FOREIGN PATENT DOCUMENTS

| DE | 29923359 U1 * | 8/2000 | .............. H02J 15/00 |
|---|---|---|---|
| DE | 102011012261 A1 | 8/2012 | |
| DE | 102016009990 A1 | 2/2018 | |
| DE | 102021112354 A1 | 11/2021 | |
| EP | 3690227 A1 | 2/2020 | |
| JP | 658178878 A | 10/1983 | |

OTHER PUBLICATIONS

European Search Report issued Jun. 8, 2022 in corresponding European Application No. 21216018.8.

\* cited by examiner

*Primary Examiner* — Julio C. Gonzalez
(74) *Attorney, Agent, or Firm* — Global IP Counselors, LLP

(57) ABSTRACT

An energy storage system includes a vessel for storing water, an energy conversion device, and a connection line connecting the vessel with the energy conversion device. The energy conversion device includes first and second housings, a pump turbine in the first housing, and a motor generator in the second housing. The pump turbine includes a first shaft and an impeller mounted on the first shaft. The motor generator includes a second shaft and a rotor at the second shaft for rotating relative to a stator. The second shaft is coupled to the first shaft for transmitting torque between the first and second shafts. The connecting line connects a low pressure opening with an opening for receiving water or discharging water. The second housing is filled with a gas for a barrier pressure during operation of the energy conversion device, such that the rotor rotates within the gas.

16 Claims, 14 Drawing Sheets

ENERGY STORAGE SYSTEM

CROSS-REFERENCE TO RELATED APPLICATION

This application claims priority to European Patent Application No. 21216018.8 filed Dec. 20, 2021, the contents of which are hereby incorporated by reference in their entirety.

BACKGROUND

Technical Field

The disclosure relates to an energy storage system.

Background Information

Wind and solar energy systems can have intermittency issues regarding power or energy generation, because wind and solar energy are sometimes not available in a sufficient amount to generate the required electric power. In other times the amount of wind and solar energy is much larger than the required electric power. To better match the renewable energy production profile with the energy demand profile, energy storage is needed to flatten the peaks and the valleys of the intermittent renewable energy production to better match the energy demand.

SUMMARY

For offshore wind energy production this is even more important since the capacity of the power transmission lines between the offshore wind park and the onshore grid are limited. Energy storage would enable storing the peak energy production of the wind park, which is above the maximum power transmission capacity. For technical and economic reasons the power transmission capacity of an offshore wind park is usually smaller than the peak power production capacity. This is also known as overplanting. As a result, it might be required to shut down some of the wind turbines during periods of very strong wind. Of course, this is not satisfactory.

It has been determined that if an economic offshore energy storage system were available, the produced energy, e.g. during times of peak production could be stored at the offshore location. This would also allow a further reduction in the capacity of the power transmission system for transporting the power from the offshore location to an onshore grid. Thus, the power transmission capacity could be much better matched to an average power production of the wind park which is a big advantage in view of an economical layout and an economical operation of the wind park and the power transmission system.

The energy storage system would be much better suited react to the changes in demand for energy. Furthermore, the energy could be stored when electricity prices are low and could be released when electricity prices are high. This allows for a considerably better match between supply and demand, which results in a reduction of gas power plant usage that are normally used as peaking power plants to cover the gap between demand and supply.

A highly efficient and well established onshore energy storage system is a pumped storage hydroelectric power plant. The principle consists of pumping water from a lower water reservoir to a higher reservoir, when excess energy is available. When there is a higher demand for electricity the water is allowed to flow from the higher reservoir through turbines to the lower reservoir, and the turbines drive generators to produce electric energy. Thus, the pumped storage plant transforms electric energy in potential energy by pumping the water to the higher reservoir and transforms potential energy in electric energy when the water drives the turbines upon flowing from the higher reservoir to the lower reservoir.

It has been proposed to use the same principle, i.e. selectively converting between potential energy and electric energy, at an underwater location, for example at a subsea location on the sea ground or in a deep lake. Such an energy storage system is for example disclosed in US 2015/361948 A1.

A large vessel, for example a hollow concrete sphere, is positioned on the seabed. Optionally, but not necessarily the inside of the vessel is openly connected to the atmosphere above the sea surface. The vessel corresponds to the lower reservoir and the surrounding seawater pressure corresponds to the higher reservoir.

When the vessel is filled with water a pump empties the vessel by discharging the water from the vessel against the hydrostatic pressure of the water prevailing at the underwater location of the pump. Thus, electric energy is converted to potential energy. This corresponds to pumping the water from the lower reservoir to the higher reservoir in a usual pumped storage plant.

To regain the electric energy the water surrounding the vessel is allowed to fill the vessel by passing through a turbine, which drives a generator. Thus, the potential energy of the surrounding water is converted in electric energy. This corresponds to allowing the water to flow from the higher reservoir to the lower reservoir through a turbine in a usual pumped storage reservoir.

In order to minimize the equipment at the underwater location it is advantageous to use an energy conversion device that can be operated in both directions. The energy conversion device comprises a pump turbine unit which is coupled with a motor generator unit. For emptying the vessel the pump turbine unit is operated in a pump mode and driven by the motor generator unit operated in a motor mode. For filling the vessel, the flow direction through the pump turbine unit is reversed. The pump turbine unit is operated in a turbine mode and drives the motor generator unit which is then operated in a generator mode to produce electric energy.

Usually, a plurality of vessels, e.g. spheres or cylindrical vessels are provided at the underwater location to increase the capacity of the energy storage system. A single energy conversion device can be used to selectively fill and discharge a plurality of vessels.

It goes without saying that each vessel has to be strong enough to withstand the hydrostatic pressure of the water at the underwater location, even if the vessel is empty. Therefore, concrete is a preferred material to manufacture the vessels.

The capacity of the energy storage system, which is crucial for its economic viability, depends on the number of vessels, the volume of the vessels that can be filled with water as well as the depth of the underwater location where the vessels are located. In case the vessel is shaped as a sphere, the inner diameter should be at least 30 m for but can be 100 m or even more. The depths of the underwater location. e.g. at the sea ground, should preferably be at least a few hundred meters for an economically reasonable operation of the energy storage system. Since the distance of the underwater location from the water surface determines the hydrostatic pressure at the underwater location it is desirable to install the energy recovery system even deeper, for example at least 1000 m or at least 2000 m below the water surface.

Therefore pump turbine units and motor generator units are required, which are able to reliably operate in such a depth under the water surface. The design of such pumps, turbines, motors or generators is challenging, in particular because said equipment shall operate in a difficult subsea environment for a long time period with as little as possible maintenance and service work. This requires specific measures to minimize the amount of equipment involved and to optimize the reliability of the equipment.

Subsea pumps which can be operated on the sea ground in a depth of 2000 m or even more are known from the oil and gas industry. In view of an efficient exploitation of oil and gas fields, there is nowadays an increasing tendency to install pumps and in particular water injection pumps directly on the sea ground in particular down to a depth of 1000 m or even down to more than 2000 m beneath the water surface. For driving such subsea pumps it is known to use liquid filled or flooded induction motors or permanent magnet motors. The motor can be filled with a barrier liquid, which prevents the process fluid from entering the motor. It goes without saying that for subsea installations on the sea ground the reliability of a pump and the minimization of wear and degradation within the pump are of utmost importance.

Another important criterion for the economic operation of an energy storage system is the efficiency of the energy conversion meaning that the energy losses for the conversions between potential energy and electric energy should be reduced as much as possible. The overall cycle efficiency or the recovery efficiency for the energy should be maximized.

It is therefore an object of the present disclosure to propose an energy storage system configured for installation at an underwater location, e.g. a subsea location at the sea ground, having a high cycle efficiency regarding the energy conversion from potential energy into electric energy and vice versa.

The subject matter of embodiments of the invention satisfying this object is characterized by the features described herein.

Thus, according to the disclosure, an energy storage system configured for installation at an underwater location is proposed, comprising a vessel for storing water, an energy conversion device for selectively converting between potential energy and electric energy, and a connection line connecting the vessel with the energy conversion device,
- wherein the energy conversion device comprises a first housing, a second housing, a pump turbine unit arranged in the first housing, and a motor generator unit arranged in the second housing,
- wherein the first housing comprises a low pressure opening and a high pressure opening for the water
- wherein the pump turbine unit comprises a first shaft for rotating about an axial direction, and at least one impeller mounted on the first shaft for interacting with the water,
- wherein the motor generator unit comprises a second shaft for rotating about the axial direction, and a rotor provided at the second shaft for rotating relative to a stator,
- wherein the second shaft is coupled to the first shaft for transmitting a torque between the first shaft and the second shaft, and
- wherein the connecting line is configured to connect the low pressure opening with an opening provided at the vessel for receiving water from the vessel or discharging water into the vessel.

The second housing is filled with a gas for providing a barrier pressure during operation of the energy conversion device, such that the rotor rotates within the gas.

Thus, the energy storage system according of the disclosure is configured for installation at an underwater location and makes use of the hydrostatic pressure of the water surrounding the vessel for the storage of energy. The underwater location can be a subsea location, for example on the sea ground or a location at the ground of a deep lake. Preferably, the underwater location is at a depth—as measured from the water surface—which is at least 400 m, but can be at least 1000 m or at least 2000 m or even more. The energy storage system comprises the energy conversion device having a pump turbine unit and a motor generator unit. For emptying the vessel the pump turbine unit works in a pump mode in which the first shaft with the at least one impeller is driven by the motor generator unit operating in a motor mode. The water is discharged from the vessel against the hydrostatic pressure prevailing at the high pressure opening of the first housing, This corresponds to converting electric energy in potential energy. For filling the vessel the surrounding water is allowed to enter the pump turbine unit through the high pressure opening and to leave the pump turbine unit through the low pressure opening. The pump turbine unit works in a turbine mode in which the first shaft with the at least one impeller drives the motor generator unit operating in a generator mode. The water fills the vessel. This corresponds to converting potential energy in electric energy.

The second housing, namely the housing in which the motor generator unit is arranged, is filed with a gas during operation of the energy conversion device. The gas generates a barrier pressure, so that the water cannot enter the motor generator unit and the rotor of the motor generator unit rotates within the gas. The gas is preferably air or nitrogen. Since the rotor can rotate in the gas, the efficiency of the motor generator unit is considerably higher as compared to a liquid filled motor or a flooded motor. The drag and the friction of a rotor rotating in a liquid are substantially larger than the drag and the friction of a rotor rotating in the gas. Due to the rotation of the rotor in the gas the energy losses are remarkably reduced and this is true for both directions of the energy conversion, i.e. both for the motor mode and for the generator mode. Because of this strong reduction of the friction losses caused by the rotating rotor the cycle efficiency of the energy storage system is significantly increased.

As an additional advantage the motor generator unit does not require a barrier liquid. Regarding a motor filled with a barrier liquid, a leakage of the barrier liquid to the environment can occur. This might cause environmental problems. Alternatively an environmentally friendly barrier liquid would be required. All these problems do not exist in the energy storage system according to embodiments of the invention, because the motor generator unit does not require a barrier liquid.

According to a preferred configuration the energy storage system comprises a supply line for supplying the gas to the underwater location. The supply line can be connected to a gas source located at or above the water surface, e.g. on a platform. By the supply line any gas leaking from the energy conversion device can be replaced.

It is a preferred measure that the energy storage system comprises a shaft seal for sealing the second housing at the first shaft or at the second shaft. This measure is particularly preferred for such embodiments, where only the second housing, in which the motor generator unit is arranged, is filled with the gas to generate the barrier pressure. By the shaft seal for sealing the second housing at the first or the second shaft, the leakage of the gas from the second housing along the first or the second shaft is considerably reduced.

According to a preferred embodiment the energy storage system comprises a pressure chamber, which is filled with the gas for providing the barrier pressure during operation of the energy conversion device, wherein the motor generator unit is arranged inside the pressure chamber. In this embodiment not only the inside of the second housing is filled with the gas, but the second housing containing the motor generator unit is arranged in a pressure chamber and the pressure chamber is filled with the gas up to the barrier pressure.

Furthermore, it is preferred, that the pump turbine unit is arranged inside the pressure chamber. The first housing containing the pump turbine unit is also arranged in the pressure chamber. Thus, both the second housing with the motor generator unit inside and the first housing with the pump turbine unit inside are arranged in the pressure chamber and the pressure chamber is pressurized with the gas up to the barrier pressure.

It is a further preferred configuration, that the first housing and the second housing are fixedly connected to each other to form a common housing of the energy conversion device. To provide the common housing for both the pump turbine unit and the motor generator unit allows a very compact configuration.

According to a preferred measure the energy storage system comprises a hydraulic cylinder for pressurizing the gas to the barrier pressure, wherein the hydraulic cylinder comprises a liquid chamber and a gas chamber, wherein the liquid chamber and the gas chamber are separated by a movable piston, wherein the piston is loaded with the hydrostatic pressure of the water in the vessel on an upper face of the piston facing the liquid chamber, and wherein the gas chamber is in fluid communication with the inside of the second housing or with the inside of the pressure chamber. The hydraulic cylinder renders possible that the barrier pressure prevailing inside the second housing or inside the pressure is at least approximately the same as the suction pressure prevailing at the low pressure opening of the pump turbine unit during the pump mode.

Furthermore, the hydraulic cylinder is preferably arranged and configured to generate the barrier pressure, wherein the barrier pressure is at least as large as a suction pressure prevailing at the low pressure opening. By this measure it can be ensured that the water does not enter the interior of the pressure chamber or the interior of the second housing.

According to another preferred embodiment, the pressure chamber is delimited by a diaphragm for pressurizing the gas in the pressure chamber by the hydrostatic pressure of the water prevailing at the underwater location. Since the hydrostatic pressure of the water is at least approximately the same as the discharge pressure at the high pressure opening of the energy conversion device during pump mode the barrier pressure prevailing in the pressure chamber is at least approximately the same as the discharge pressure.

According to still another preferred configuration the energy storage system comprises a hydraulic accumulator for pressurizing the gas to the barrier pressure, wherein the hydraulic accumulator is located at an accumulator location, and comprises a liquid side and a gas side, which are separated by a flexible membrane, % wherein the membrane is loaded at the liquid side with the hydrostatic pressure of the water prevailing at the accumulator location, and wherein the gas side of the hydraulic accumulator is in fluid communication with the inside of the second housing or with the inside of the pressure chamber. By this measure it is also possible to pressurize the gas to a barrier pressure which is at least approximately the same as the discharge pressure at the high pressure opening of the energy conversion device during pump mode.

Even more preferred the hydraulic accumulator is arranged and configured to generate the barrier pressure, wherein the barrier pressure is larger as a discharge pressure prevailing at the high pressure opening of the energy conversion device. This can be realized by choosing the accumulator location such that the membrane is located at a deeper level than the high pressure opening of the pump turbine unit.

Furthermore it is preferred that the pump turbine unit comprises a mechanical seal for sealing the pump turbine unit at the first shaft, wherein the mechanical seal is exposed essentially to the same pressure that prevails at the high pressure opening of the energy conversion device. In particular, when the barrier pressure is slightly larger than the pressure prevailing at the high pressure opening during pump mode, there is only a very small pressure drop over the mechanical seal which reduces the leakage through the mechanical seal.

According to still another preferred embodiment the motor generator unit is configured hermetically sealed, wherein a magnetic coupling is provided for coupling the first shaft and the second shaft. For this embodiment there is no supply line required for supplying the gas to the underwater location.

It is a further preferred option that the motor generator unit comprises a plurality of second shaft bearings for supporting the second shaft with each shaft bearing being configured as a magnetic bearing. Magnetic bearings do not require any lubrication, which might be an advantage regarding the installation at an underwater location.

Regarding the pump turbine unit it is a preferred option that the pump turbine unit comprises at least one first shaft bearing for supporting the first shaft, wherein each first shaft bearing is configured as a product lubricated bearing. Due to the product lubrication, i.e. the lubrication by the water, the first shaft bearing does not require any lubrication by another lubricant, which might be an advantage regarding the installation at an underwater location Further advantageous measures and embodiments of the invention will become apparent from the description herein.

BRIEF DESCRIPTION OF THE DRAWINGS

Embodiments of the invention will be explained in more detail hereinafter with reference to the drawings.

DETAILED DESCRIPTION

Figure 1:
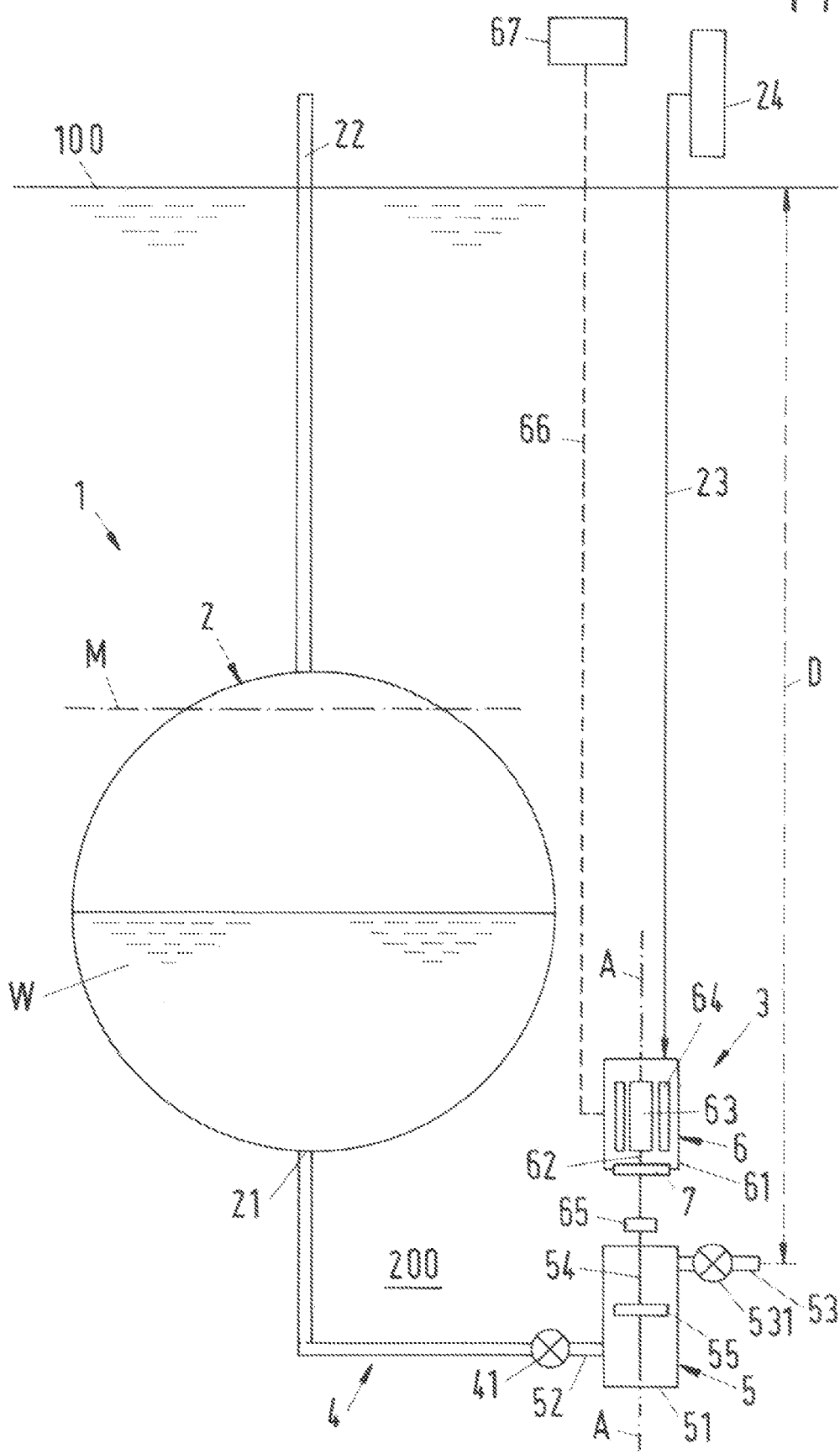
FIG. 1 is a schematic representation of a first embodiment of an energy storage system according to the invention.

FIG. 1 shows a schematic representation of a first embodiment of an energy storage system according to the invention. The energy storage system is designated in its entity with reference numeral 1 and is configured for an installation at an underwater location 200 below a water surface 100. The underwater location 200 can be for example a subsea location on the sea ground or a location at the ground of a deep lake. In the following description the term "depth" designates the vertical distance from the water surface 100. The underwater location 200 is preferably at a depth of at least 400 m. The underwater location 200 can be at a considerably greater depth, for example at a depth of at least 1000 m or at least 2000 m.

In the following description the terms "high", "higher", "low", "lower" and the like refer to the respective depth. With respect to a location, for example the location of a component, the term "lower" means "at a greater depth" and the term "higher" means "at a smaller depth". Thus, the relative designations "higher" and "lower" refer to the vertical distance from the water surface 100. A higher location is closer to the water surface 100 or higher as measured from the bottom of the lake or the sea or the water body than a lower location.

The energy storage system 1 comprises a vessel 2 arranged at the underwater location 200. The vessel 2 for storing water W is secured for example to the sea ground. The vessel 2 is configured to withstand the pressure prevailing at the underwater location 200. The vessel 2 is for example made of concrete and can be configured as a hollow sphere or as a hollow cylinder for receiving water W. If the vessel 2 is configured as a hollow sphere, its inner diameter is preferably at least 30 m, but can also be considerably larger, for example 100m or even more. The vessel 2 can also be configured as a cylindrical pipe or in another cylindrical shape. Particularly preferred, the vessel 2 has a volume of at least 100'000 m³. The energy storage system 1 can also comprise a plurality of vessels 2 arranged at the underwater location 200. It goes without saying that each vessel 2 is configured to withstand the hydrostatic pressure of the water prevailing at the underwater location 200.

The energy storage system 1 further comprises an energy conversion device 3 which is also arranged at the underwater location 200 in the proximity of the vessel 2 or at the vessel 2. The energy conversion device 3 is configured for selectively converting potential energy in electric energy or electric energy in potential energy. The energy conversion device 3 comprises a pump turbine unit 5, a motor generator unit 6, a first housing 51 and a second housing 61, wherein the pump turbine unit 5 is arranged in the first housing 51 and the motor generator unit 6 is arranged in the second housing 61. The pump turbine unit 5 is operable in a pump mode for pumping water W out of the vessel 2 and in a turbine mode for being driven by the water W discharged into the vessel 2 from the environment at the underwater location 200. The motor generator unit 6 is operable in a motor mode for driving the pump turbine unit 5, when the pump turbine unit 5 is operated in the pump mode. Furthermore, the motor generator unit 6 is operable in a generator mode for generating electric energy, w % ben the pump turbine unit 5 operates in the turbine mode and drives the motor generator unit 6.

The first housing 51 has a low pressure opening 52 and a high pressure opening 53 for the Water W, a first shaft 54 for rotating about an axial direction A, and at least one impeller 55, preferably a plurality of impellers 55, mounted on the first shaft 54 for interacting with the water. The axial direction A is defined by the longitudinal axis of the first shaft 54. The high pressure opening 53 is located at a depth D. Thus, the hydrostatic pressure of the water at the depth D is essentially the discharge pressure prevailing at the high pressure opening 53, against which the pump turbine unit 5 has to pump the water W out of the vessel 2 in the pump mode.

The high pressure opening 53 can be provided with a first shut-off valve 531 for opening and closing the flow passage through the high pressure opening 53. When the first shut-off valve 531 is in the open position, the high pressure opening 53 is open and the water can pass through the high pressure opening 53. When the first shut-off valve 531 is in the closed position, the high pressure opening 53 is closed and the water cannot pass through the high pressure opening 53, i.e. the water can neither flow into the first housing 51 nor can the water leave the first housing 51 through the high pressure opening 53.

In the pump mode the first shaft 54 is driven by the motor generator unit 6 and the impeller(s) 55 covey(s) the water W from the vessel 2 through the low pressure opening 52 to the high pressure opening 53, where the water W is discharged to the environment. In the turbine mode the water enters the first housing 51 from the environment through the high pressure opening 53, drives the impeller(s) 55 and is discharged through the low pressure opening 52 into the vessel 2.

The motor generator unit 6 arranged in the second housing 61 comprises a second shaft 62 for rotating about the axial direction A and a rotor 63 fixed to the second shaft 62 for rotating relative to a stator 64, which is arranged stationary with respect to the second housing 61. The second shaft 62 is coupled to the first shaft 54 by a coupling 65 for transmitting a torque between the first shaft 54 and the second shaft 62. An electric power line 66 is provided, which connects the motor generator unit 6 with an energy unit 67 located at or above the water surface for example on a platform. The energy unit 67 can be connected to a grid. In the motor mode the motor generator unit 6 receives electric energy from the energy unit 67 through the electric power line 66. The electric energy is used to rotate the rotor 63 and the second shaft 62 relative to the stator 64. The second shaft 62 drives the rotation of the first shaft 54, so that the pump turbine unit 5 is operated in the pump mode. In the generator mode the second shaft 62 is driven by the first shaft 54 and the rotation of the rotor 63 relative to the stator 64 generates electric energy which is delivered to the energy unit 67 by the electric power line 66.

Preferably, the pump turbine unit 5 is configured as a vertical pump turbine unit 5, meaning that during operation the first shaft 54 is extending in the vertical direction, which is the direction of gravity. Thus, the axial direction A coincides with the vertical direction.

Furthermore, the energy storage system 1 comprises a connecting line 4 that is configured to connect the low pressure opening 52 of the pump turbine unit 5 with an opening 21 provided at the vessel 2. The opening 21 is preferably arranged at the bottom of the vessel 2 or at a location of the vessel 2 being arranged at the greatest depth of the vessel 2. In the pump mode the connecting line 4 receives water W from the vessel 2 by the pumping action of the pump turbine unit 5. In the turbine mode the water W leaves the first housing 51 through the low pressure opening 52 and is discharged through the connecting line 4 and the opening 21 into the vessel 2.

The connecting line 4 can be provided with a second shut-off valve 41 for opening and closing the flow passage through the connecting line 4. When the second shut-off valve 41 is in the open position, the water can pass through the connecting line 4 into the pump turbine unit 5 during pump mode or out of the pump turbine unit 5 during turbine mode. When the second shut-off valve 41 is in the closed position, the passage through the connecting line 4 is closed and the water cannot pass through the connecting line 4.

The second shut-off valve 41 is particularly advantageous for embodiments of the energy storage system 1 comprising a plurality of vessels 2. For each vessel 2 a separate connecting line 4 with a second shut-off valve 41 is provided. Thus, the energy conversion device 3 can be selectively connected with each of the vessels 2.

In other embodiments only one of the shut-off valves 531 is provided, 41. i.e. the first shut-off valve 531 is provided at the high pressure opening 53 and there is no second shut-off valve provided at the connection line 4, or the second shut-off valve 41 is provided at the connection line and there is no first shut-off valve provided at the high pressure opening 53.

Optionally, the vessel 2 comprises a vent 22 extending from the vessel 2 to a location at or above the water surface 100. By the vent 22 the pressure prevailing in the interior of the vessel 2 above the water W is essentially the same as the atmospheric pressure at the water surface 100, meaning that the water W in the vessel 2 is exposed to the ambient pressure prevailing at the water surface 100.

Furthermore, the vessel 2 can comprise a controller (not shown in detail) for ensuring that the water level in the vessel 2 will not exceed a maximum level M. The controller can comprise a sensor (not shown) for checking the fill level of the vessel. During turbine mode the vessel 2 is filled with water W. As soon as it is detected that the vessel 2 is filled to the maximum level M, the controller will prevent a further flow of water W into the vessel 2, e.g. by closing the first shut-off valve 531 and/or the second shut-off valve 41.

According to the disclosure the second housing 61 is filled with a gas for providing a barrier pressure during operation of the energy conversion device 3 such that the rotor 63 of the motor generator unit 6 rotates within a gas. The gas is preferably air or nitrogen or any other gas that is environmentally acceptable and does not cause problems when it leaks to the environment.

The gas generates a barrier pressure, which is as high that the water cannot enter the second housing 61 containing the motor generator unit 6. The rotor 63 of the motor generator unit 6 rotates within the gas. Compared to liquid filled motors or flooded motors, where the rotor has to rotate in a liquid, the efficiency of the motor generator unit 6 of the energy storage device 1 according to the disclosure is considerably higher. The friction of the rotor 63 rotating in the gas is substantially lower than the friction of a rotor rotating in a liquid. Due to the rotation of the rotor 63 in the gas the energy losses are remarkably reduced and this is true for both the motor mode and the generator mode. Because of this strong reduction of the friction losses caused by the rotor 63 the cycle efficiency of the energy storage system 1 is significantly increased. The energy losses for the conversion from electric energy in potential energy as well as the energy losses for the conversion back from potential energy in electric energy are substantially reduced.

The operation of the energy storage system 1 will now be described. With exemplary character it is assumed that the vessel 2 is filled with water W up to the maximum level M. To "charge" the energy storage system, the motor generator unit 6 is operated in the motor mode and the pump turbine unit 5 is operated in the pump mode. If present, the first shut-off valve 531 and the second shut-off valve 41 are switched to the open position. The motor generator unit 6 receives electric energy from the energy unit 67 through the electric power line 66 and drives the first shaft 54 with the impeller(s) 55. The hydrostatic pressure of the water W in the vessel 2 and the connecting line 4 generates the suction pressure prevailing at the low pressure opening 52. The hydrostatic pressure of the water at the underwater location 200 generates the discharge pressure prevailing at the high pressure opening 53. The pump turbine unit 5 conveys the water W from the low pressure opening 52 to the high pressure opening 53, where the water is discharged to the environment at the underwater location. As soon as the vessel 2 is completely emptied or emptied to a predefined minimum level the pump mode is terminated for example by closing the first shut-off valve 531 and/or the second shut-off valve 41. The energy storage system 1 is "charged".

For recovering electric energy from potential energy the energy storage system 1 is "discharged". For this purpose the pump turbine unit 5 is operated in the turbine mode and the motor generator unit 6 is operated in the generator mode. Each of the first shut-off valve 531 and the second shut-off valve 41, if present, is switched to the open position. The hydrostatic pressure prevailing at the underwater location 200 at the depth D causes the water to flow through the high pressure opening 53 and to drive the impeller(s) 55 of the pump turbine unit 5. The water W is discharged through the low pressure opening 52 into the connecting line 4 and starts to fill the vessel 2. The first shaft 54 of the pump turbine unit 5 drives the second shaft 62 of the motor generator unit 6 and therewith causes the rotor 63 to rotate relative to the stator 64. By the rotation of the rotor 63 electric energy is generated, which is supplied through the electric power line 66 to the energy unit 67. The energy unit 67 can, for example, feed the electric energy to a grid or to a transmission line. As soon as the vessel 2 is filled, for example filled to the maximum level M, the turbine mode and therewith the generator mode is terminated for example by closing the first shut-off valve 531 and/or the second shut-off valve 41. The energy storage system 1 is "decharged".

In the first embodiment of the energy storage system 1 shown in FIG. 1, only the second housing 61, in which the motor generator unit 6 is arranged, is filled with gas. The second housing 61 is configured to be robust enough to withstand the hydrostatic pressure and the environmental conditions at the underwater location 200.

A supply line 23 for supplying the gas to the second housing 61 is provided. The supply line 23 is connected to the interior of the second housing 61 and extends to a gas source 24, which is located at or above the water surface 100. The gas source 24 can be arranged for example on a platform. The gas source 24 can comprise a pressure reservoir for the gas and/or a compressor for pressurizing the gas. The gas source 24 is configured to supply the gas with the barrier pressure via the supply line 23 to the interior of the second housing 61, so that the second housing 61 is pressurized to the barrier pressure by the gas.

A shaft seal 7 is provided at the second housing 61 for sealing the second housing 61 at the second shaft 62. Preferably, the second shaft 62 extends through the second housing 61 to the exterior of the second housing 61 to the coupling 65, where the second shaft 62 is coupled to the first shaft 54. Thus, the coupling 65 is preferably arranged outside the second housing 61. The shaft seal 7 is for example configured as a mechanical seal and seals the interior of the second housing 61 against the environment at the underwater location 200. The barrier pressure is adjust such that it is at least slightly larger than the hydrostatic pressure of the water at the underwater location 200 acting on the shaft seal 7. Thus, it is prevented that the water enters the second housing 61. Since the barrier pressure prevailing inside the second housing 61 is larger than the environmental pressure prevailing at the outside of the second housing 61 any leakage through the shaft seal 7 is always directed from the interior of the second housing 61 to the exterior of the second housing 61. The gas can leak from the second housing 61 through the shaft seal 7 to the environment, but the water cannot leak through the shaft seal 7 into the second housing 61. Thus, the water is reliably prevented from entering the second housing 61 filled with the gas. The amount of gas leaking through the shaft seal 7 is replaced by the gas source 24 through the supply line 23.

Figure 2:
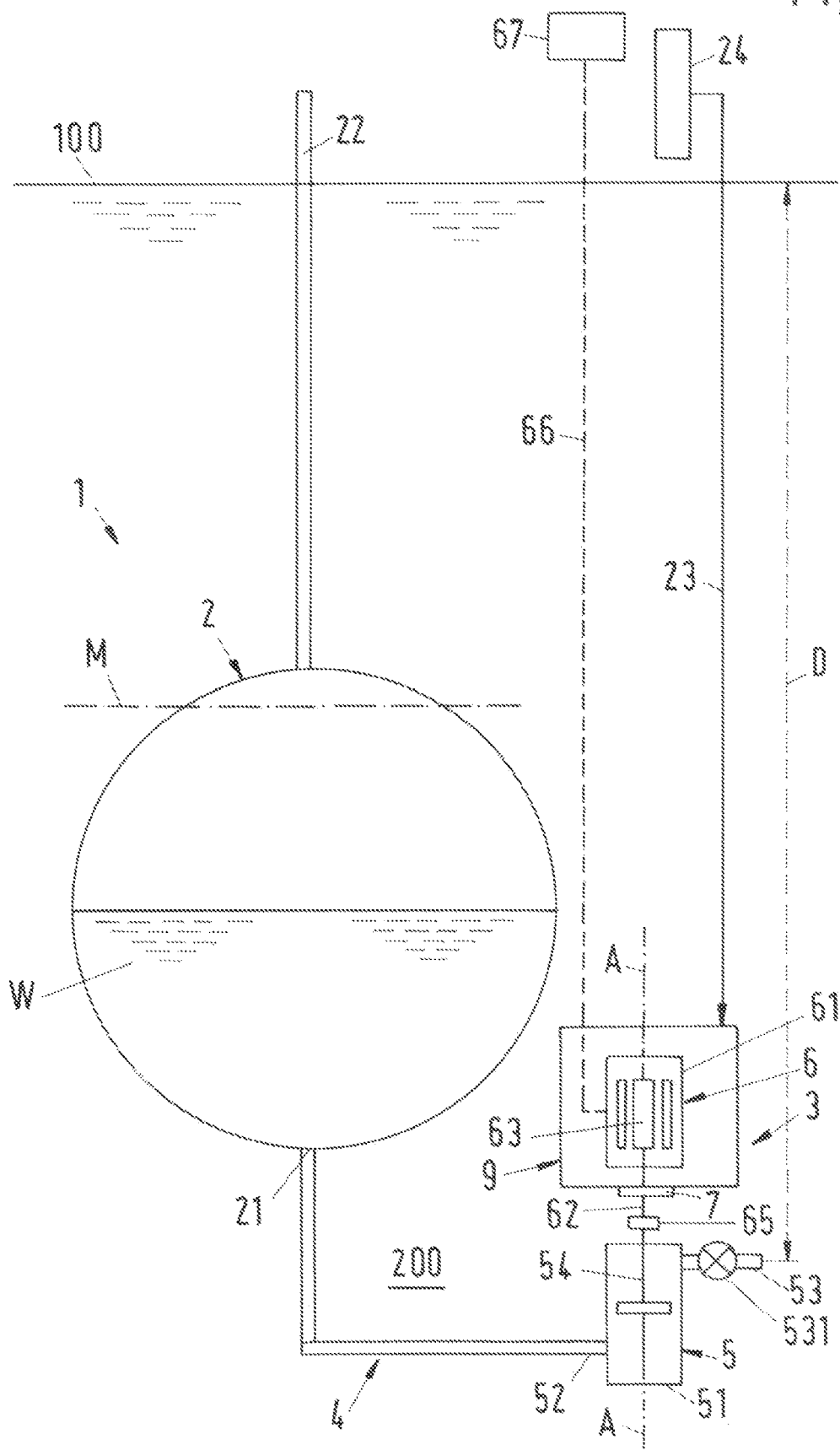
FIG. 2 is a schematic representation of a second embodiment of an energy storage system according to the invention.

FIG. 2 shows a schematic representation of a second embodiment of an energy storage system 1 according to the disclosure.

In the following description of the second embodiment of the energy storage system 1 only the differences to the first embodiment are explained in more detail. The explanations with respect to the first embodiment are also valid in the same way or in analogously the same way for the second embodiment. Same reference numerals designate the same features that have been explained with reference to the first embodiment or functionally equivalent features.

The second embodiment of the energy storage system 1 comprises a pressure chamber 9, which is filled with the gas at the barrier pressure during operation of the energy storage system 1. The second housing 61 and the motor generator unit 6 arranged within the second housing 61 are arranged inside the pressure chamber 9. The shaft seal 7 is provided at the pressure chamber 9 for sealing the pressure chamber 9 at the second shaft 62. Preferably, the second shaft 62 extends through the pressure chamber 9 to the exterior of the pressure chamber 9 to the coupling 65, where the second shaft 62 is coupled to the first shaft 54. Thus, the coupling 65 is preferably arranged outside pressure chamber 9. In other embodiments the coupling 65 can be arranged inside the pressure chamber 9.

The pressure chamber 9 is configured to be robust enough to withstand the hydrostatic pressure and the environmental conditions at the underwater location 200. The pressure chamber 9 can be made of concrete or steel or any other material which is suited to withstand the environmental conditions at the underground location 200.

The supply line 23 for supplying the gas to the underwater location 200 is in fluid communication with the interior of the pressure chamber 9, so that the interior of the pressure chamber 9 can be pressurized up to the barrier pressure by the gas source 24 and the supply line 23.

Furthermore, any gas losses by leakage through the shaft seal 7 to the environment can be compensated by the supply line 23. Therefore, it is ensured that the interior of the pressure chamber 9 is always at the barrier pressure, which is larger than the environmental pressure prevailing at the outside of the pressure chamber 9.

Since the second housing 61 is arranged within the pressure chamber 9, the gas also enters the second housing 61 and fills the motor generator unit 6, so that the rotor 63 can rotate within the gas during operation.

The heat that might be generated by the motor generator unit 6 can be dissipated to the water through the walls of the pressure chamber 9. In particular if the pressure chamber 9 is made of concrete, it is possible to provide some metal tubes, e.g. extending vertically or horizontally through the pressure chamber 9 and passing through the walls of the pressure chamber 9 to dissipate the heat to the environment. The tubes are filled with water, e.g. seawater, as heat carrier and then by natural convection the water will be heated. This will create some flow by temperature difference. As a further option an external cooler can be provided as an heat exchanger to dissipate the heat to the water in the environment of the pressure chamber 9. The heat exchanger can be filled with the gas as heat carrier.

Providing the second housing 61 with the motor generator unit 6 inside the pressure chamber 9 has the advantage that the second housing 61 can be configured considerably less strong, e.g. considerably thinner, because the second housing 61 is not exposed to a remarkable pressure difference, meaning the pressure at the inside of the second housing 61 is at least essentially the same as the pressure at the outside of the second housing 61, which is the barrier pressure prevailing in the pressure chamber 9.

As shown in FIG. 2 the second embodiment comprises the first shut-off valve 531 but not the second shut-off valve 41 at the connection line 4. It has to be understood that the second embodiment of the energy storage system 1 can additionally or alternatively comprise the second shut-off valve 41. Providing the second shut-off valve 41 in the second embodiment is preferred, because otherwise at standstill, there will be a leakage of the water into the pump turbine unit 5 and the vessel 2 will continue to further fill up.

Figure 3:
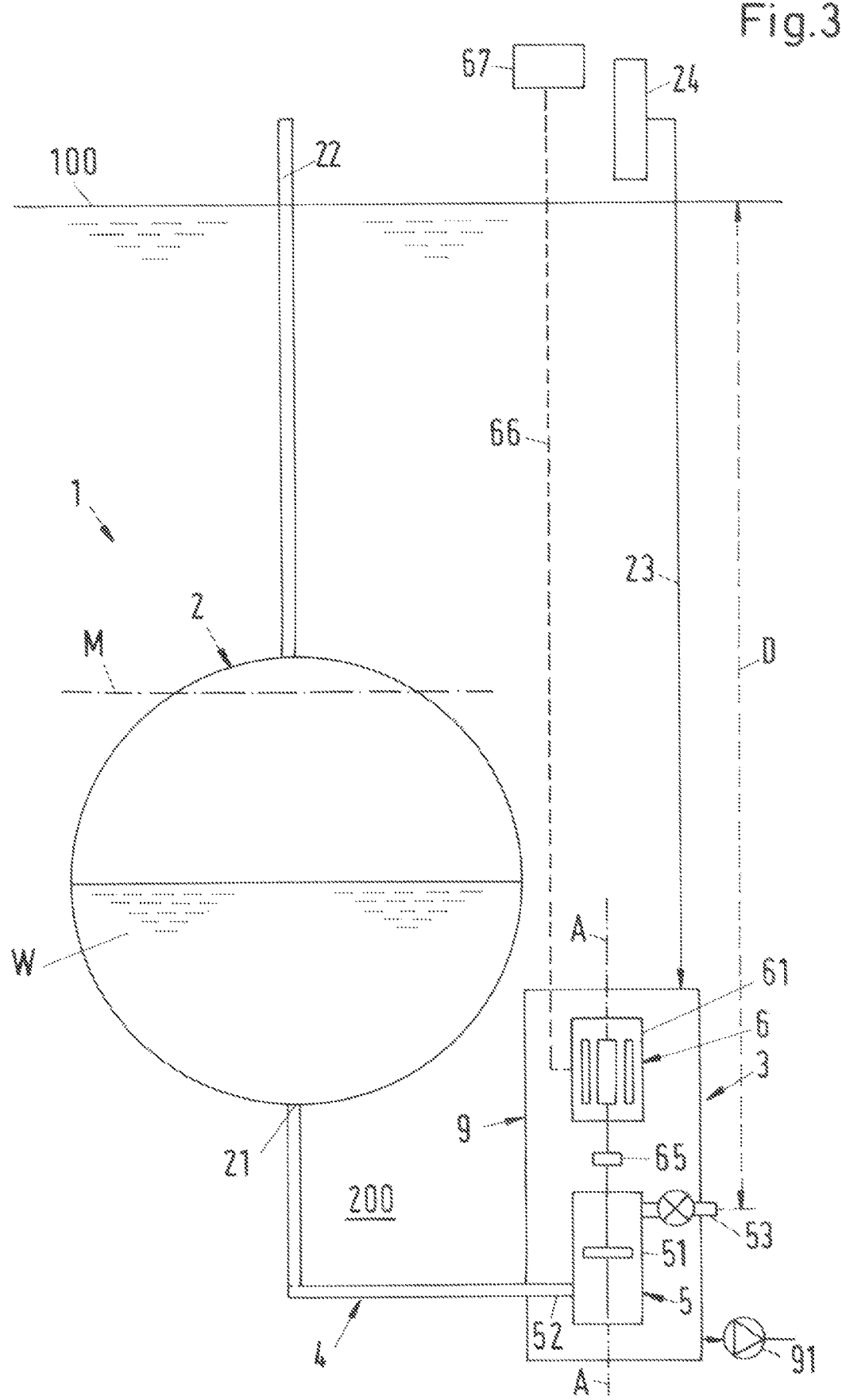
FIG. 3 is a schematic representation of a third embodiment of an energy storage system according to an embodiment of the invention.

FIG. 3 shows a schematic representation of a third embodiment of an energy storage system 1 according to the disclosure.

In the following description of the third embodiment of the energy storage system 1 only the differences to the first and the second embodiment are explained in more detail. The explanations with respect to the first embodiment and the second embodiment are also valid in the same way or in analogously the same way for the third embodiment. Same reference numerals designate the same features that have been explained with reference to the first and the second embodiment or functionally equivalent features.

According to the third embodiment of the energy storage system 1 the first housing 51 with the pump turbine unit 5 arranged within the first housing 51 is also arranged inside the pressure chamber 9. Thus, both the first housing 51 with the pump turbine unit 5 inside and the second housing 61 with the motor generator unit 6 inside are arranged inside the pressure chamber 9.

This configuration has the advantage, that the entire energy conversion device 3 comprising the pump turbine unit 5 and the motor generator unit 6 as well as the coupling 65 can be pre-installed at a topside location and placed in its entity into the pressure chamber 9. Furthermore, also the pump turbine unit 5 and the coupling 65 are not exposed to the harsh environmental conditions at the underwater location 200 but protected by the pressure chamber 9.

As it will be explained in more detail later on, the pump turbine unit 5 can be configured as a multistage centrifugal pump. It is a usual configuration for such pumps that the shaft seals, for example mechanical seals, are exposed on the process side of the seal to the suction pressure prevailing at the inlet of the pump. The process side of the mechanical seal is the side facing the process fluid, here the water, which is conveyed by the pump. The main reason for this configuration is the reduction of leakage losses. If the process side of the particular mechanical seal is exposed to the suction pressure (rather than for example the discharge pressure) the pressure difference across the mechanical seal can be kept small.

For such configurations of the pump turbine unit 5, where the shaft seal is exposed on its process side to the suction pressure prevailing at the low pressure opening 52 during pump mode, the barrier pressure prevailing in the pressure chamber 9 is kept at a value, which is slightly larger than the suction pressure prevailing at the low pressure opening 52 during the pump mode. Thus, any leakage through the mechanical seal is directed from the pressure chamber 9 to the process side of the mechanical seal, meaning that the gas can leak from the pressure chamber 9 into the pump turbine unit 5 but the water cannot leak through the mechanical seal into the pressure chamber 9.

Nevertheless, as an option a drainage pump 91 can be provided to remove water from the interior of the pressure chamber 9. If, by whatever reason, water enters the pressure chamber 9, this leaking water can be discharged by the drainage pump 91 before the water can enter the motor generator unit 6. Water could for example enter the pressure chamber by a leakage of the pump turbine unit 5 or any other leakage into the pressure chamber 9. The drainage pump 91 can be configured as a rotary pump, e.g. a centrifugal pump, or as a positive displacement pump such as a piston pump.

In addition or alternatively to the drainage pump 91 it is also possible to increase the barrier pressure prevailing inside the pressure chamber 9. e.g. to a value which is larger than the discharge pressure generated by the pump turbine unit 5. Thus, the water could not leak out of the pump turbine unit 5.

Figure 4:
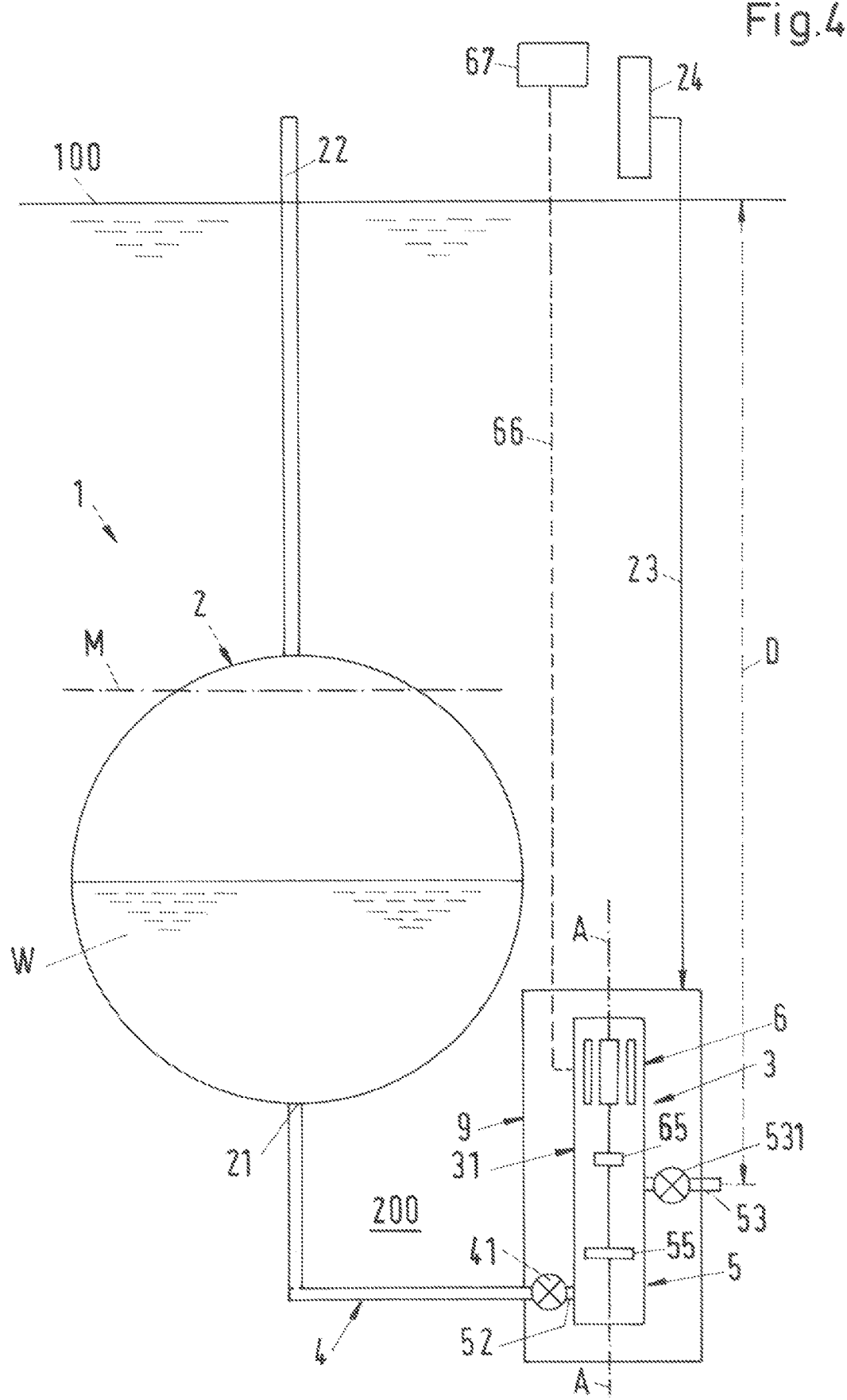
FIG. 4 is a schematic representation of a variant of the third embodiment.

FIG. 4 shows a schematic representation of a variant of the third embodiment of the energy storage system 1. In FIG. 4 the drainage pump 91 is not shown. It has to be understood that also the variant shown in FIG. 4 can optionally comprise the drainage pump 91.

In the variant shown in FIG. 4 the first housing 51 and the second housing 61 are fixedly connected to each other to form a common housing 31 of the energy conversion device 3. Thus, the energy conversion device 3 comprises the common housing 31 in which both the pump turbine unit 5 and the motor turbine unit 6 are arranged.

As a further option, FIG. 4 shows that the first shut-off valve 531 and/or the second shut-off valve 41, if present, can be arranged inside the pressure chamber 9.

Figure 5:
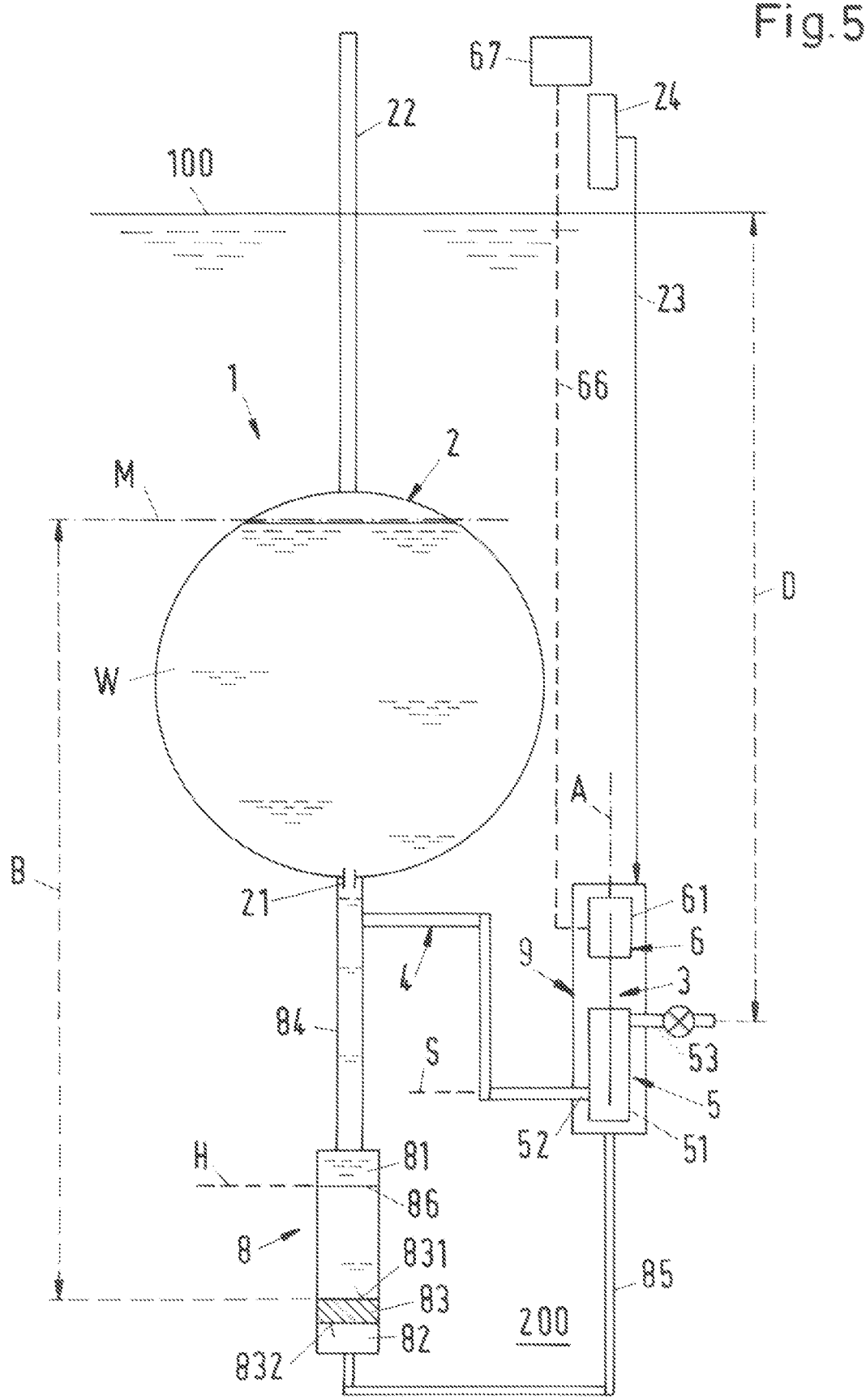
FIG. 5 is a schematic representation of a fourth embodiment of an energy storage system according to the invention, with the vessel being filled with water.
Figure 6:
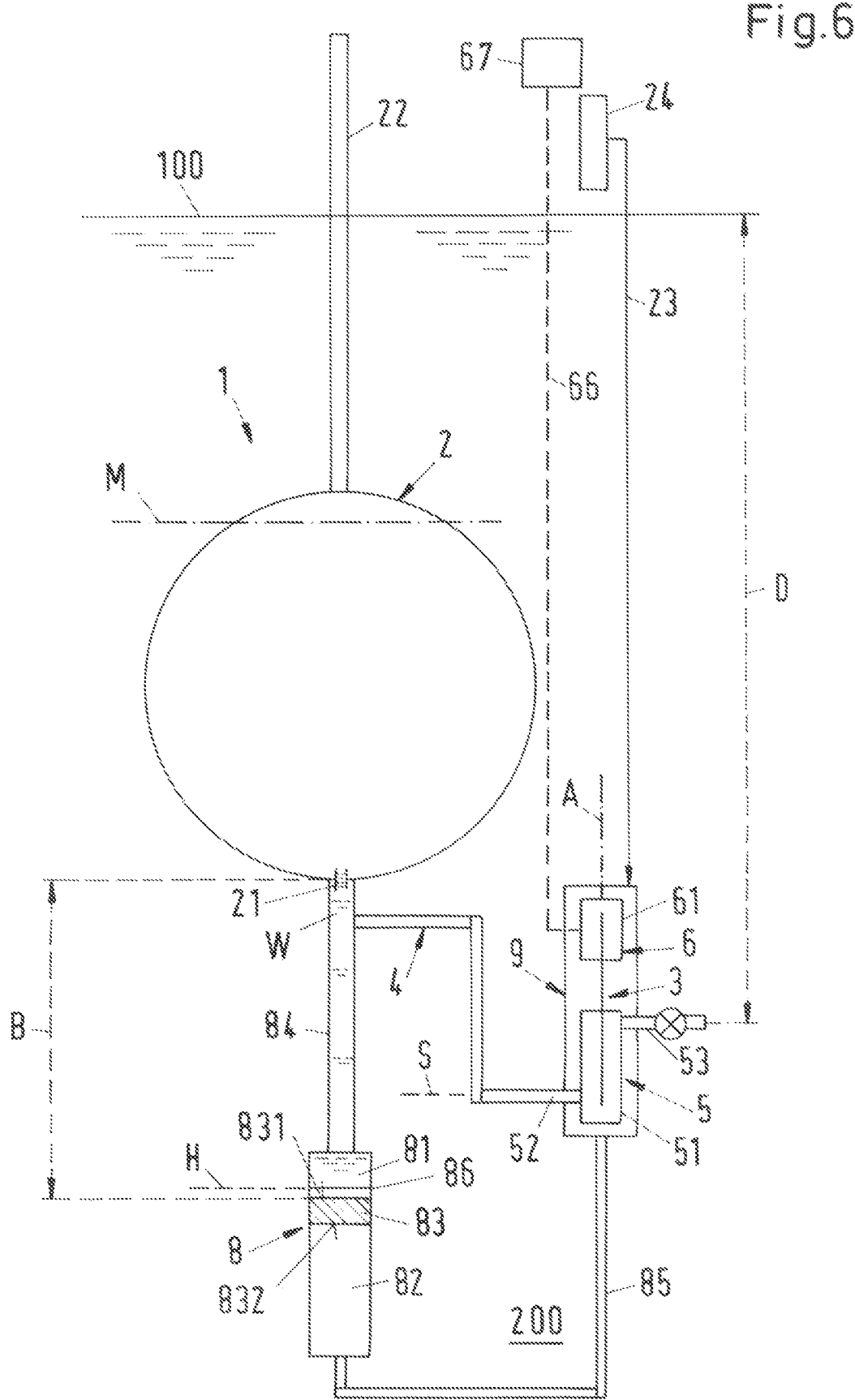
FIG. 6 is a schematic representation of the fourth embodiment with the vessel being emptied.

FIG. 5 shows a schematic representation of a fourth embodiment of an energy storage system 1 according to the disclosure. FIG. 5 shows the fourth embodiment with the vessel 2 filled with the water W up to the maximum level M, i.e. the energy storage system 1 is "decharged". FIG. 6 shows the fourth embodiment of the energy storage system 1 with the vessel 2 being emptied to the minimum level, i.e. the energy storage system 1 is "charged".

In the following description of the fourth embodiment of the energy storage system 1 only the differences to the first, second and the third embodiment are explained in more detail. The explanations with respect to the first embodiment, the second embodiment and the third embodiment are also valid in the same way or in analogously the same way for the fourth embodiment. Same reference numerals designate the same features that have been explained with reference to the first second and the third embodiment or functionally equivalent features.

In FIG. 5 and FIG. 6 the fourth embodiment of the energy storage device 1 is shown with the energy conversion device 3 arranged in the pressure chamber 9, wherein the first housing 51 and the second housing 61 are separated from each other. In other configurations of the fourth embodiment the first housing 51 and the second housing 61 are fixedly connected to each other to form a common housing 31 of the energy conversion device 3 as it has been explained with respect to the third embodiment. According to this configuration the energy conversion device 3 comprises the common housing 31 in which both the pump turbine unit 5 and the motor turbine unit 6 are arranged. In still other configurations of the fourth embodiment, only the second housing 61 with the motor generator unit 6 is arranged inside the pressure chamber 9 and the first housing 51 with the pump turbine unit 5 is arranged outside the pressure chamber 9 in an analogous manner as it has been described for the second embodiment (FIG. 2). In still other configurations of the fourth embodiment, there is no pressure chamber 9 provided, but the second housing 61 is filled with the gas providing the barrier pressure in the second housing 61 in an analogous manner as it has been described for the first embodiment (FIG. 1).

The fourth embodiment of the energy storage system 1 comprises a hydraulic cylinder 8 for pressurizing the gas in the pressure chamber 9 or in the second housing 61, respectively, to the barrier pressure. The hydraulic cylinder 8 comprises a liquid chamber 81 and a gas chamber 82, wherein the liquid chamber 81 and the gas chamber 82 are separated by a movable piston 83 providing a sealing action between the liquid chamber 81 and the gas chamber 82. The piston 83 has an upper face 831, which faces and delimits the liquid chamber 81, and a lower face 832, which faces and delimits the gas chamber 82. The upper face 831 of the piston 83 is loaded with the hydrostatic pressure of the water W in the vessel 2. To this end a flow connection 84 is provided connecting the opening 21 of the vessel 2 with the liquid chamber 81 of the hydraulic cylinder 8. The gas chamber 82 of the hydraulic cylinder 8 is in fluid communication with the inside of the pressure chamber 9 or with the inside of second housing 61, respectively. To this end a pressure line 85 is provided, which connects the gas chamber 82 of the hydraulic cylinder 8 with the pressure chamber 9 or with the second housing 61, respectively.

Preferably, the hydraulic cylinder 8 is arranged completely below the vessel 2, i.e. at a lower location than the opening 21 of the vessel 2. The pressure acting on the upper side 831 of the piston 83 is generated by the water column on the upper side 831. The hydrostatic pressure generated by said water column is given by the height B of the water column. The height B is the vertical distance between the actual water level in the vessel 2 and the actual position of the upper surface 831 of the piston 83. FIG. 5 shows the vessel 2 filled with water W up to the maximum level M, thus, also the height B is at its maximum value.

In case the area of the upper face 831 of the piston 83 equals the area of the lower face 832 of the piston 83, the pressure prevailing in the gas chamber 82 equals the pressure acting on the upper face 831 plus the pressure, which is caused by the weight of the piston 83. Due to the pressure line 85 the barrier pressure prevailing in the pressure chamber 9 or in the second housing 61, respectively, is at least approximately the same as the pressure in the gas chamber 82.

The hydraulic cylinder 8 further comprises a stop 86 for the piston 83, so that the piston 83 cannot move higher than the stop 86. The stop 86 can be configured for example as a protrusion projecting into the interior of the hydraulic cylinder 8, so that the piston 83 cannot pass the stop 86. Preferably, the stop 86 is arranged and configured such that the piston 83 abuts against the stop 86 or is located just below the stop 86, w % ben the vessel 2 is emptied to the minimum level.

FIG. 5 shows the vessel 2 filled with water W up to the maximum level M, i.e. the energy storage system 1 is discharged. The height B of the water column has its maximum value and the piston 83 is at its lowest position. When the pump mode is started the pump turbine unit 5 progressively empties the vessel 2 by pumping the water W through the high pressure outlet 53 to the environment at the underwater location 200. With falling water level in the vessel 2 the height B of the water column decreases and consequently the piston 83 moves upwardly. When the vessel 2 is emptied to the minimum level, as it is shown in FIG. 6, the piston 83 is at or just below the stop 86 and the height B of the water column has its minimum value. The energy storage system 1 is completely charged.

When the turbine mode is started, the water W flows into the vessel 2. As a consequence the height B of the water column increases and pushes the piston 83 of the hydraulic cylinder 8 downwardly until the vessel 2 is filled with water W to the maximum level M (FIG. 5) and the height B of the water column reaches its maximum value.

The connection line 4 connecting the vessel 2 with the low pressure opening 52 extends from the low pressure opening 52 to the flow connection 84 and ends in the flow connection 84 at a depth, that is between the depth H at which the stop 86 of the hydraulic cylinder 8 is located and the depth at which the opening 21 of the vessel 2 is located. Furthermore, the low pressure inlet 52 is located at a depth S which is smaller than the depth H. By this configuration it is ensured that the barrier pressure prevailing in the pressure chamber 9 is always larger than the suction pressure prevailing at the low pressure opening 52 during pump operation. As already described, the barrier pressure is at least approximately the same as the pressure prevailing in the gas chamber 82. Since the depth H, where the stop 86 is located, is larger than the depth S, where the low pressure opening 51 is located, the hydrostatic pressure generated by the water is always larger at the upper face 831 of the piston 83 than at the low pressure opening 52. Since the weight of the piston 83 additionally increases the pressure prevailing in the gas chamber 82 it is ensured that the barrier pressure prevailing in the pressure chamber 9 is always larger than the suction pressure prevailing at the low pressure opening 52 during pump operation.

At the beginning of the pump mode, when the vessel 2 is filled up to the maximum level M both the suction pressure prevailing at the low pressure opening 52 and the hydrostatic pressure acting on the upper face 831 of the piston 83 have their maximum value, wherein the hydrostatic pressure on the upper face 831 of the piston 83 exceeds the suction pressure by an amount which is given by the difference between the depth H and the depth S.

With proceeding emptying of the vessel 2 during pump mode both the suction pressure and the hydrostatic pressure acting of the upper face 831 decrease and reach their minimum value when the vessel 2 is emptied to its minimum level shown in FIG. 6. In sum, for any position of the piston 83 the hydrostatic pressure acting on the upper face 831 of the piston 83 and therewith the barrier pressure prevailing in the pressure chamber 9 is larger than the suction pressure prevailing at the low pressure opening 52.

Any losses of gas, e.g. by a gas leakage along the piston 82 of the hydraulic cylinder 8, are compensated by the gas source 24 and the supply line 23.

If, for whatever reason, it is not possible or desirable to arrange the hydraulic cylinder 8 or the energy conversion device 3 in such a manner that the depth H, at which the stop 86 for the piston 83 is located, is larger than the depth S, at which the low pressure opening 52 is located, it is still possible to ensure, that the barrier pressure prevailing in the pressure chamber 9 is always larger than suction pressure at the low pressure opening 52 during the pump mode. For example, the weight of the piston 83 can be adjusted such, that the weight increases the pressure in the gas chamber 82—and therewith the barrier pressure—to a value that exceeds the suction pressure. Furthermore, the piston 83 can be configured to provide a hydraulic amplification of the pressure acting on the upper face. This can be achieved, for example, by configuring the upper face 831 of the piston 83 with a larger area than the lower face 832, such that the pressure is amplified by the piston 83.

As already explained with respect to the third embodiment of the energy storage system 1 (FIG. 3) also the fourth embodiment of the energy storage system can comprise the drainage pump 91.

Figure 7:
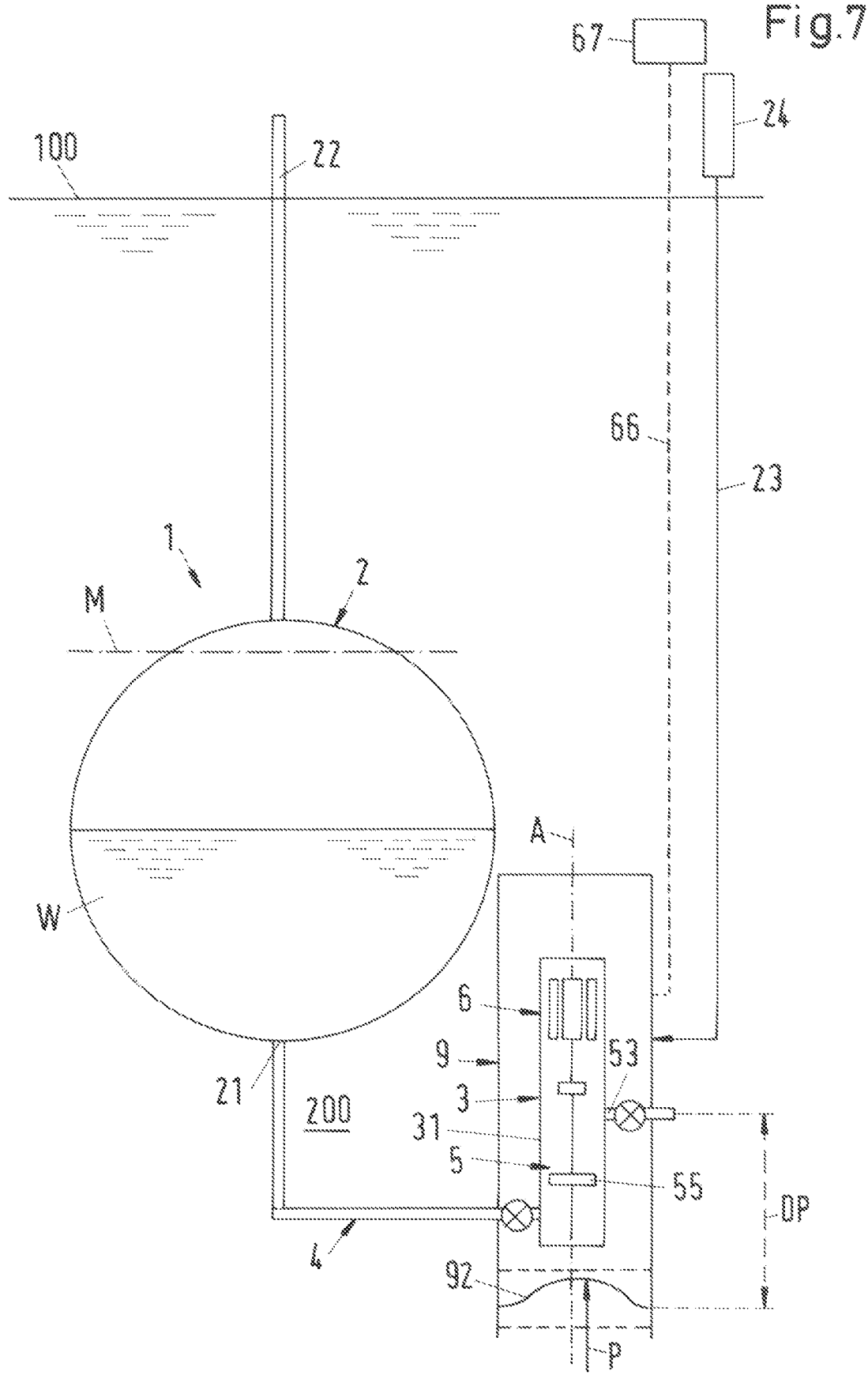
FIG. 7 is a schematic representation of a fifth embodiment of an energy storage system according to the invention.

FIG. 7 shows a schematic representation of a fifth embodiment of an energy storage system 1 according to the disclosure.

In the following description of the fifth embodiment of the energy storage system 1 only the differences to the first, second and the third embodiment are explained in more detail. The explanations with respect to the first embodiment, the second embodiment and the third embodiment are also valid in the same way or in analogously the same way for the fifth embodiment. Same reference numerals designate the same features that have been explained with reference to the first second and the third embodiment or functionally equivalent features.

In FIG. 7 the fifth embodiment of the energy storage device 1 is shown with the energy conversion device 3 arranged in the pressure chamber 9, wherein the energy conversion device 3 comprises the common housing 31, in which both the pump turbine unit 5 and the motor generator unit 6 are arranged. In other configurations of the fifth embodiment the first housing 51 and the second housing 61 are separated from each other with both the first housing 51 and the second housing 61 being arranged inside the pressure chamber 9, as it has been explained with respect to the third embodiment. In still other configurations of the fifth embodiment, only the second housing 61 with the motor generator unit 6 is arranged inside the pressure chamber 9 and the first housing 51 with the pump turbine unit 5 is arranged outside the pressure chamber 9 in an analogous manner as it has been described for the second embodiment (FIG. 2).

In the fifth embodiment of the energy storage system 1 the pressure chamber 9 is pressurized during operation to the barrier pressure, wherein the barrier pressure is at least as large as the discharge pressure prevailing at the high pressure opening 53 of the energy conversion device 3. Preferably, the barrier pressure is larger than the discharge pressure. The discharge pressure equals the hydrostatic pressure of the water at the depth, where the high pressure opening 53 ends in the environment at the underwater location 200. The high pressure opening 53 can be located directly at the common housing 31 or at a distance away from the common housing 31. If the high pressure opening 53 is located remote from the common housing 31, e.g. to avoid the sucking in of sand, stones or other undesired materials, the high pressure opening 53 can be connected to the common housing 31 by a pipe or by a hose, e.g. such that the high pressure opening 53 is levitating in the water at the underwater location 200.

Providing a barrier pressure prevailing in the pressure chamber 9 which is at least as large and preferably larger than the discharge pressure prevailing at the high pressure opening 53 is particularly advantageous regarding the pump mode at the underwater location 200. Conventional centrifugal pumps, e.g. centrifugal pumps operating at topside locations, are usually operated with a suction pressure that is fairly constant, but the discharge pressure can significantly vary. In order to minimize the leakage through the mechanical seals sealing the shaft of the pump it is advantageous to keep the pressure difference across the mechanical seal at least approximately constant. Therefore, it is quite usual to configure the pumps in such a manner that the process side of the mechanical seal is exposed to a pressure that is at least approximately the same as the suction pressure. When the pump turbine unit 5 of the energy storage system 1 operates in the pump mode, the discharge pressure, namely the hydrostatic pressure at the high pressure opening 53, is constant, but the suction pressure strongly varies between a maximum value w % ben the vessel 2 is filled up to the maximum level M and a minimum value, when the vessel 2 is emptied to the minimum level.

Since the discharge pressure is constant to a high degree during operation of the pump turbine unit 5 in the pump mode, it is advantageous to configure the pump turbine unit 5 such that the process side of the shaft seal, e.g. a mechanical seal, is exposed to the discharge pressure. Therefore, the barrier pressure prevailing in the pressure chamber 9 should be at least as large and preferably larger than the discharge pressure to avoid a leakage of the water through the shaft seal from the pump turbine unit 5 into the pressure chamber 9. When the barrier pressure in the pressure chamber 9 is larger than the discharge pressure prevailing at the high pressure opening 53, the gas can leak through the seal into the pump turbine unit 5, but the water cannot leak in the other direction from the pump turbine unit 5 through the seal into the pressure chamber 9.

In the fifth embodiment of the energy storage device 1 the pressure chamber 9 is delimited by a diaphragm 92 for pressurizing the gas in the pressure chamber 9 or in the second housing 61, respectively, by the hydrostatic pressure prevailing at the underwater location 200. The hydrostatic pressure of the water at the underwater location 200 exerts a pressure on the diaphragm 92 as it is indicated by the arrow P in FIG. 7. Said pressure P is transmitted to the gas in the pressure chamber 9, so that the gas in the pressure chamber 9 is pressurized to the barrier pressure which is at least as large as the discharge pressure prevailing at the high pressure opening. Preferably and as it is shown in FIG. 7, the diaphragm 92 is located at a deeper location than the high pressure opening 53. The diaphragm 92 is arranged at a depth, which exceeds the depth D, at which the high pressure opening 53 is located by a difference DP. Thus, the hydrostatic pressure of the water prevailing at the diaphragm 92 is larger than the hydrostatic pressure of the water prevailing at the high pressure opening 53. The difference between the hydrostatic pressure prevailing at the diaphragm 92 and the hydrostatic pressure prevailing at the high pressure opening 53 is determined by the difference DP.

Figure 8:
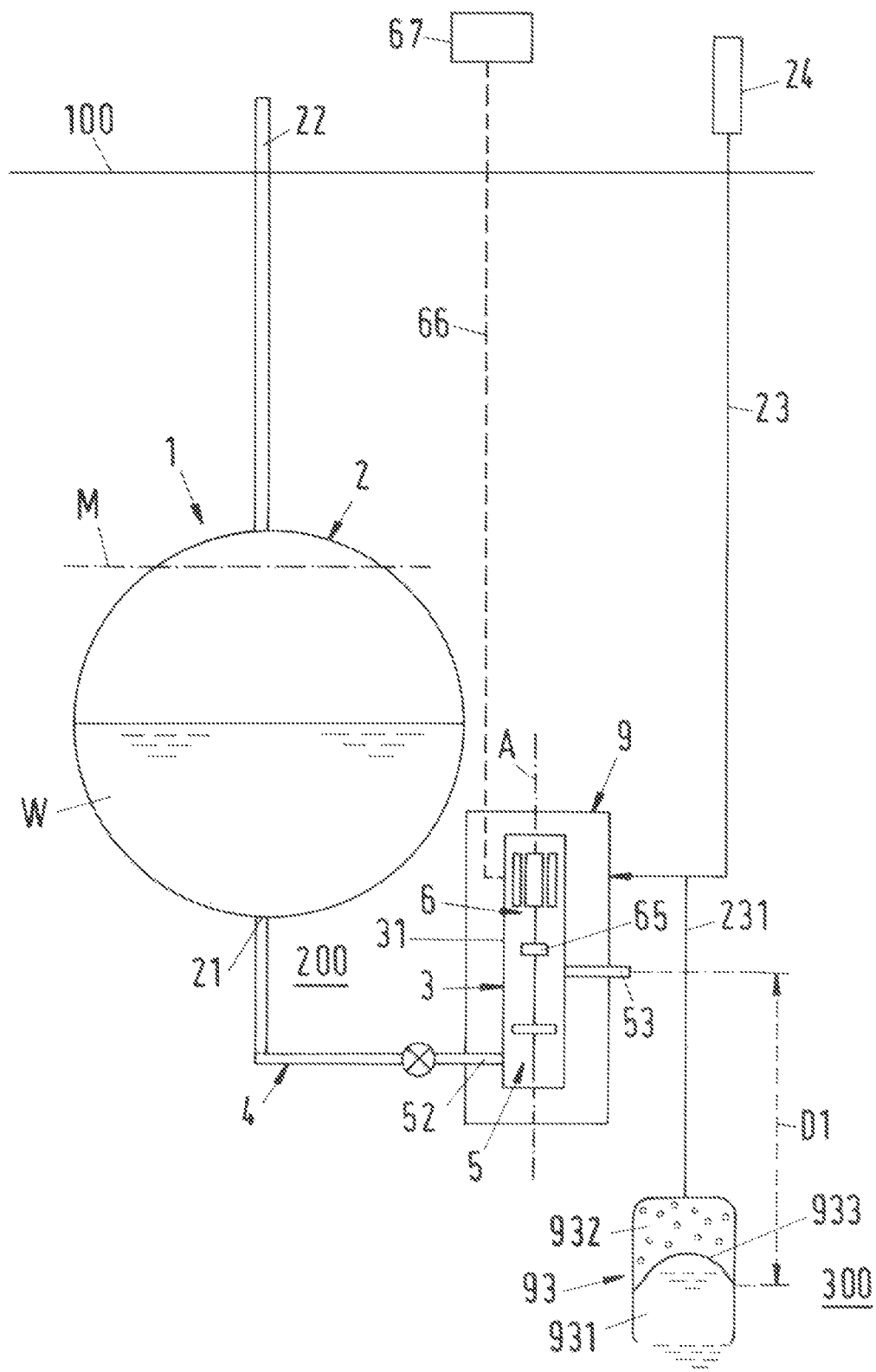
FIG. 8 is a schematic representation of a sixth embodiment of an energy storage system according to the invention.

FIG. 8 shows a schematic representation of a sixth embodiment of an energy storage system 1 according to the disclosure.

In the following description of the sixth embodiment of the energy storage system 1 only the differences to the precedingly described embodiments are explained in more detail. The explanations with respect to precedingly described embodiments are also valid in the same way or in analogously the same way for the sixth embodiment. Same reference numerals designate the same features that have been explained with reference to the precedingly described embodiments or functionally equivalent features.

In FIG. 8 the sixth embodiment of the energy storage device 1 is shown with the energy conversion device 3 arranged in the pressure chamber 9, wherein the energy conversion device 3 comprises the common housing 31, in which both the pump turbine unit 5 and the motor turbine unit 6 are arranged. In other configurations of the sixth embodiment the first housing 51 and the second housing 61 are separated from each other with both the first housing 51 and the second housing 61 being arranged inside the pressure chamber 9, as it has been explained with respect to the third embodiment (FIG. 3). In still other configurations of the sixth embodiment, only the second housing 61 with the motor generator unit 6 is arranged inside the pressure chamber 9 and the first housing 51 with the pump turbine unit 5 is arranged outside the pressure chamber 9 in an analogous manner as it has been described for the second embodiment (FIG. 2). In still other configurations of the sixth embodiment, there is no pressure chamber 9 provided, but the second housing 61 is filled with the gas providing the barrier pressure in the second housing 61 in an analogous manner as it has been described for the first embodiment (FIG. 1).

Similar as in the fifth embodiment, also in the sixth embodiment of the energy storage system 1 the pressure chamber 9 is pressurized during operation to the barrier pressure, wherein the barrier pressure is at least as large as the discharge pressure prevailing at the high pressure opening 53 of the energy conversion device 3. Preferably, the barrier pressure is larger than the discharge pressure.

Different to the fifth embodiment the pressure chamber 9 of the sixth embodiment is not delimited by a diaphragm 92 but only by rigid walls, e.g. walls made of concrete or metall.

The sixth embodiment of the energy storage system 1 comprises a hydraulic accumulator 93 for pressurizing the gas in the pressure chamber 9 or in the second housing 61, respectively, to the barrier pressure. The hydraulic accumulator 93 is in fluid communication with the supply line 23 for the gas. A branch line 231 connects the hydraulic accumulator 93 with the supply line 23. The hydraulic accumulator 93 is located at an accumulator location 300, which is at least at the same depth D as the high pressure opening 53 of the energy conversion device 3. Preferably, the accumulator location 300 is at a depth which is a distance D1 below the depth D, at which the high pressure opening 53 is located. Thus, the accumulator location 300 is at a depth of D+D1. The hydraulic accumulator 93 comprises a liquid side 931 and a gas side 932, which are separated by a flexible membrane 933. The membrane is loaded at the liquid side 931 with the hydrostatic pressure of the water prevailing at the accumulator location 300. For example, the liquid side 931 is open to the environment at the accumulator location

300. The gas side 932 of the hydraulic accumulator 93 is in fluid communication with the inside of the pressure chamber 9 by the branch line 231 and the supply line 23. Thus, the gas in the pressure chamber 9 is pressurized to essentially the same pressure that prevails at the accumulator location 300. Since the accumulator location 300 is at a greater depth D+D1 than the high pressure opening 53, the gas in the pressure chamber 9 is pressurized to the barrier pressure being larger than the discharge pressure prevailing at the high pressure opening 53.

In configurations of the sixth embodiment of the energy storage system 1 where no pressure chamber 9 is provided (FIG. 1), the gas side 932 of the hydraulic accumulator 93 is in fluid communication with the inside of the second housing 61 by the branch line 231 and the supply line 23.

Figure 12:
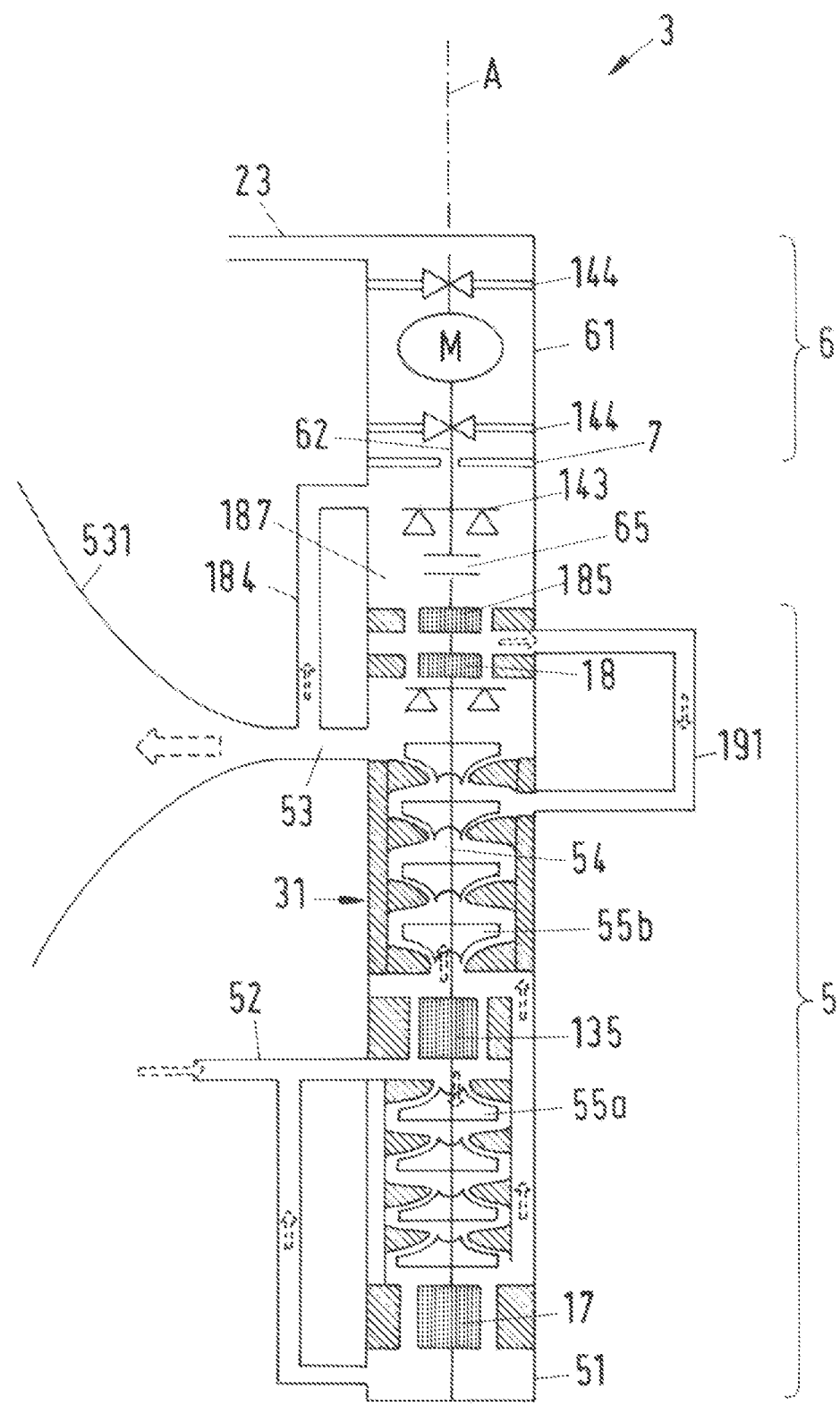
Figure 13:
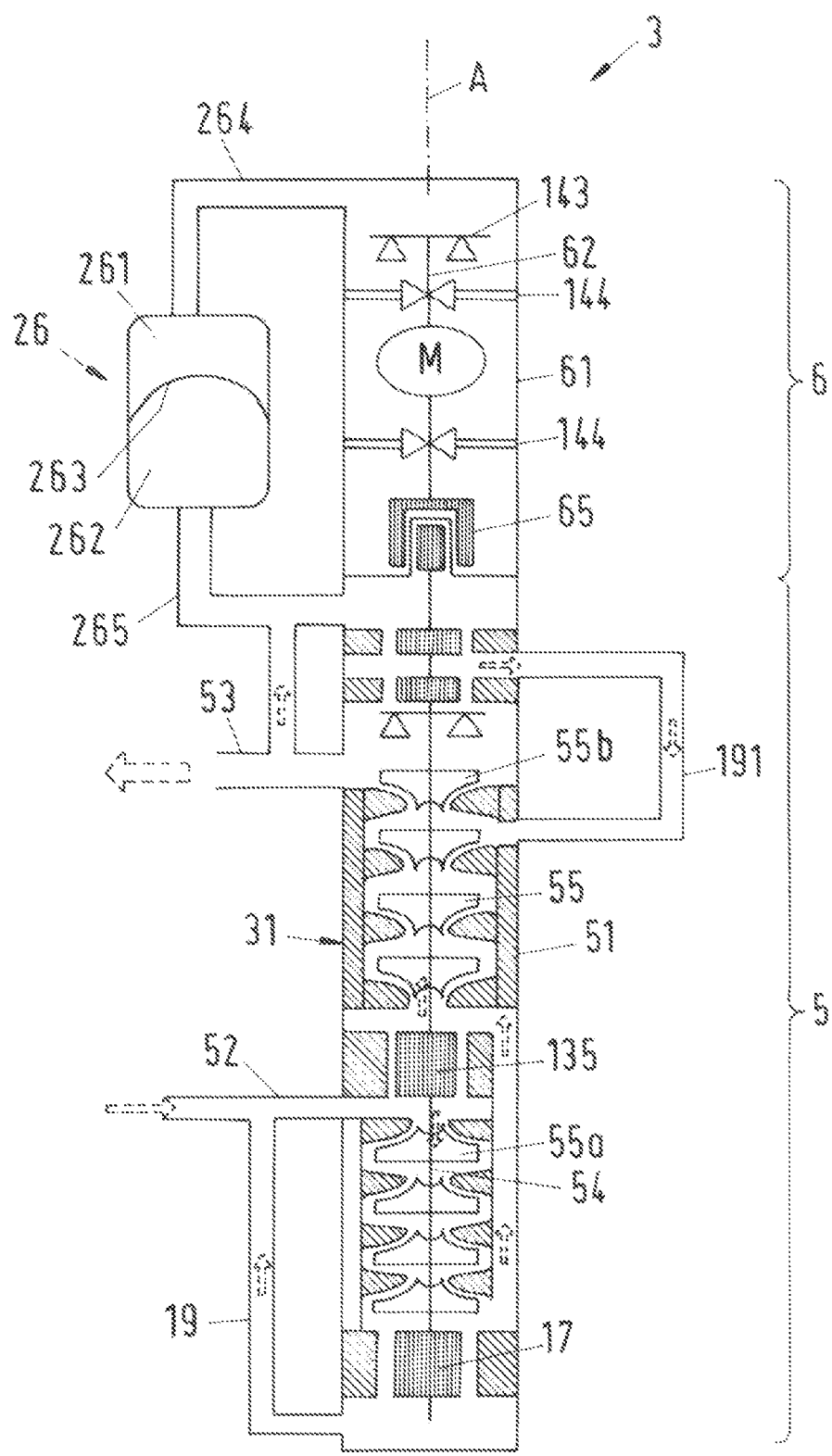
Figure 14:
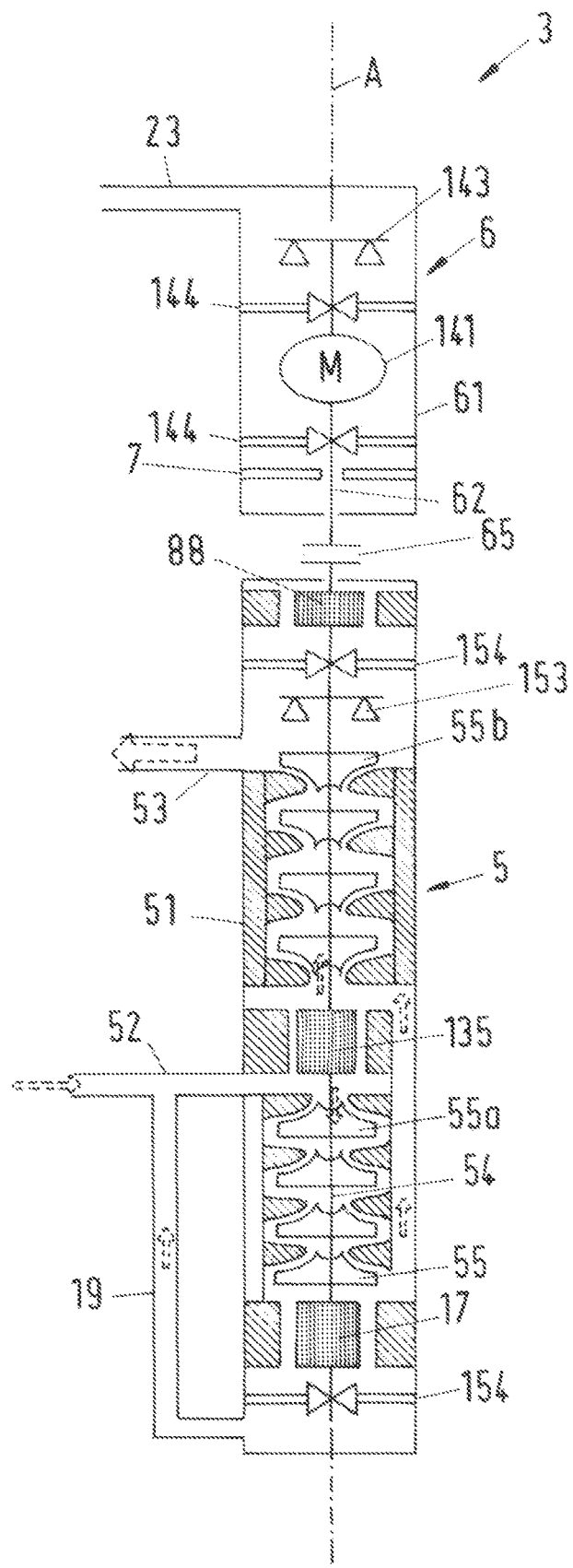

Referring now to FIG. 9 to FIG. 14 different embodiments of the energy conversion device 3 of an energy storage device 1 according to the disclosure will be described in more detail. The schematic representations in FIG. 9-FIG. 13 all show the pump turbine unit 5 and the motor generator unit 6 arranged in the common housing 31 formed by fixedly connecting the first housing 51 and the second housing 61 to each other. It has to be understood that in other configurations of the embodiments shown in FIG. 9-FIG. 13 the first housing 51 and the second housing 61 can be configured as separate housings spaced apart from each other as it is shown for example in FIG. 3. FIG. 14 shows an embodiment of the energy conversion device 3 having a separate first housing 51 and a separate second housing 61, which are spaced apart from each other.

It goes without saying that the embodiments shown in FIG. 9-FIG. 14 are examples, only. The invention is not restricted to these configurations of the pump turbine unit 5 and the motor generator unit 6, respectively.

Basically, each centrifugal pump that can also be operated in a reverse direction, i.e. in a turbine mode, for driving the second shaft 62 of the motor generator unit 6 during operation in the generator mode, is suited as pump turbine unit 5 for the energy conversion device 3. In embodiments having no pressure chamber 9 or in embodiments where the pump turbine unit 5 is located outside the pressure chamber 9, the pump turbine unit 5 has to be configured such that it can withstand the environmental conditions at the underwater location 200. Furthermore, when operating in the pump mode the pump turbine unit 5 has to be strong enough to empty the vessel 2 against the hydrostatic pressure of the water prevailing at the underwater location 200, more particular at the high pressure opening 53.

Preferably the pump-turbine unit 5 is configured as a multistage pump having a plurality of impellers 55 which are all mounted on the first shaft 54 in a torque proof manner. The pump turbine unit 5 can be configured, for example, in an analogous manner as it is known from water injection pumps at subsea locations in the oil and gas processing industry.

Figure 9:
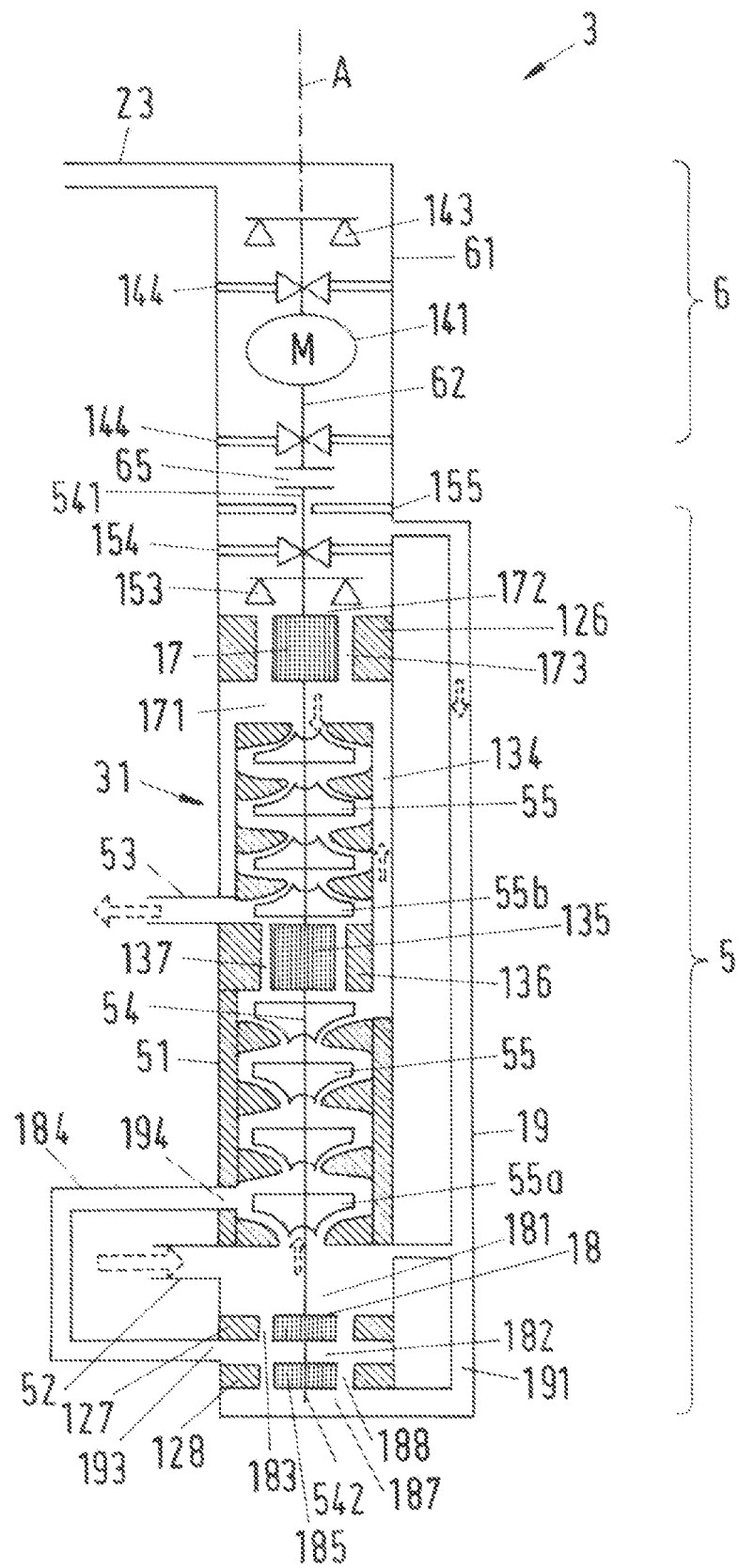
FIG. 9-FIG. 14 illustrate different embodiments of the energy conversion device of an energy storage system according to the disclosure.

FIG. 9 shows an embodiment of the energy conversion device 3 comprising the motor generator unit 6 and the pump turbine unit 5. In this embodiment the pump turbine unit 5 is configured as a process fluid lubricated pump turbine unit 5. The term "process fluid lubricated pump turbine unit" refers to pumps or pump turbine units, where the process fluid, that is conveyed by the pump 1, here namely water, is used for the lubrication and the cooling of components of the pump turbine unit 5, e.g. the bearings. The process fluid lubricated pump turbine unit 5 does not require a lubricant different from the process fluid for the lubrication of the pump turbine unit components. The process fluid is the sole lubricant used in the pump. Regarding the energy storage device 1 the process fluid is water, for example fresh water, when the underwater location 200 is in a deep lake, or seawater, when the underwater location 200 is a subsea location. The term seawater comprises raw seawater, purified seawater, pretreated seawater, filtered seawater and so on.

The common housing 31 comprising the first housing 51 and the second housing 61 surrounds the pump turbine unit 5 and the motor generator unit 6. It is also possible that the first housing 51 and the second housing 61 are inserted into a barrel housing which forms the common housing 31. The common housing 31 of the pump turbine unit 5 and the motor generator unit 6 comprises the low pressure opening 52, which is the inlet during pump mode, and the high pressure opening 53, which is the outlet during pump mode. The pressure of the water at the low pressure opening 52 during pump mode is referred to as suction pressure. The pressure of the water at the high pressure opening 53 during pump mode is referred to as discharge pressure. The discharge pressure is given by the hydrostatic pressure of the water prevailing in the environment of the high pressure opening 53.

The pump turbine unit 5 comprises the first shaft 54 extending from a drive end 541 to a non-drive end 542 of the first shaft 54. The first shaft 54 is configured for rotating about the axial direction A, which is defined by the longitudinal axis of the first shaft 54. The drive end 541 of the first shaft 54 is connected to the coupling 65 that is arranged between the pump turbine unit 5 and the motor generator unit 6.

The motor generator unit 6 comprises the second shaft 62 that is configured for rotating about the axial direction A. The second shaft 62 is connected to the coupling 65. During pump mode the second shaft 62 drives the first shaft 54. During turbine mode the first shaft 54 drives the second shaft 62.

The coupling 65 is configured for transferring a torque between the first shaft 54 and the second shaft 62. Preferably the coupling 65 is configured as a flexible coupling 65, which connects the second shaft 62 to the first shaft 54 in a torque proof manner, but allows for a relative movement between the second shaft 62 and the first shaft 54, e.g. lateral movements. Thus, the coupling 65 transfers the torque but no or nearly no lateral vibrations. The flexible coupling 65 can be configured as a mechanical coupling, a magnetic coupling, a hydrodynamic coupling or any other coupling that is suited to transfer a torque between the second shaft 62 to the first shaft 54.

The pump turbine unit 5 comprises the plurality of impellers 55. The plurality of impellers comprises at least a first stage impeller 55*a* fixedly mounted on the first shaft 54 as well as a last stage impeller 55*b* fixedly mounted on the first shaft 54. The first stage impeller 55*a* is the impeller 55*a* next to the low pressure opening 52 and the last stage impeller 55*b* is the impeller 55*b* pressurizing the water to the discharge pressure during pump mode. Optionally, the pump turbine unit 5 further comprises one or more intermediate stage impeller(s) 55. Each intermediate stage impeller 55 is arranged between the first stage impeller 55*a* and the last stage impeller 55*b* when viewed in the direction of increasing pressure during pump mode, i.e. the direction of the main fluid flow through the pump turbine unit 5 during pump mode. In the embodiment shown in FIG. 9 six intermediate stage impellers 55 are provided, i.e. the pump turbine unit 5 is configured as an eight stage pump. It goes without saying that the number of eight stages is only exemplary. The pump turbine unit can be designed also as a multistage pump having more or less than eight stages. I The impellers 55a, 55, 55b are arranged in a back-to-back arrangement. The pump turbine unit 5 comprises a first set of impellers 55a, 55 and a second set of impellers 55, 55b wherein the first set of impellers 55a, 55 and the second set of impellers 55, 55b are arranged on the first shaft 54 such, that the axial thrust generated by the first set of impellers 55a, 55 is directed opposite to the axial thrust generated by the second set of impellers 55, 55b. The first set of impellers 55a, 55 comprises the first stage impeller 55a and the three intermediate stage impellers 55 of the next three stages and the second set of impellers 55, 55b comprises the last stage impeller 55b and the three intermediate stage impellers 55 of the three preceding stages. In other embodiments the first set of impellers can comprise a different number of impellers than the second set of impellers.

As indicated in FIG. 9 by the dashed arrows without reference numeral, during pump mode the process fluid enters the pump turbine unit 5 through the low pressure opening 52 at the lower end of the pump turbine unit 5, passes the stages one (first stage), two, three and four, is then guided through a crossover line 134 to the suction side of the fifth stage at the upper end of the pump turbine unit 5, passes the stages five, six, seven and eight (last stage), and is then discharged through the high pressure opening 53, which is arranged between the upper end and the lower end of the pump turbine unit 5.

For many applications the back-to-back arrangement is preferred because the axial thrust acting on the first shaft 54, which is generated by the first set of impellers 55a, 55 counteracts the axial thrust, which is generated by the second set of impellers 55, 55b. Thus, said two axial thrusts compensate each other at least partially.

It has to be noted that the number of individual impellers 55, 55a, 55b forming the first set of impellers 55a, 55 and the number of individual impellers forming the second set of impellers 55, 55b can be different or can be the same.

In other embodiments (not shown) the plurality of impellers is arranged in an inline arrangement. All impellers are arranged one after another on the first shaft 54 in such a manner that the axial thrust generated by the action of the rotating impellers 55 has the same direction for each particular impeller 55a, 55b, 55.

As it is shown in FIG. 9 the pump turbine unit 5 is configured as a vertical pump, meaning that during operation the first shaft 54 is extending in the vertical direction, which is the direction of gravity. Thus, the axial direction A coincides with the vertical direction. The motor generator unit 6 is arranged above the pump turbine unit 5. During pump mode the motor generator unit 6, exerts a torque on the drive end 541 of the first shaft 5 for driving the rotation of the first shaft 54 and the impellers 55, 55a, 55b about the axial direction A.

A direction perpendicular to the axial direction is referred to as radial direction. The term 'axial' or 'axially' is used with the common meaning 'in axial direction' or 'with respect to the axial direction'. In an analogous manner the term 'radial' or 'radially' is used with the common meaning 'in radial direction' or 'with respect to the radial direction'. Hereinafter relative terms regarding the location like "above" or "below" or "upper" or "lower" or "top" or "bottom" refer to the usual operating position of the energy conversion device 3. FIG. 9-FIG. 14 show different embodiments and variants of the energy conversion device in their respective usual operating position.

In other embodiments (not shown) the pump turbine unit 5 can be configured as a horizontal pump, meaning that during operation the first shaft 54 is extending perpendicular to the vertical direction, which is the direction of gravity. Thus, the axial direction A is perpendicular to the vertical direction.

In the embodiment of the energy conversion device 3 shown in FIG. 9 the first shaft 54 of the pump turbine unit 5 is supported by first shaft bearings 153, 154. With respect to the axial direction A the first shaft 54 is supported by an first axial bearing 153. Preferably the first axial bearing 153 is configured as a hydrodynamic bearing, and even more preferred as a tilting pad bearing 153. The first axial bearing 153 is arranged near the drive end 541 of the first shaft 54. Furthermore, the pump turbine unit 5 comprises a first radial bearing 154 for supporting the first shaft 54 with respect to the radial direction. The first radial bearing 154 is arranged near the drive end 541 of the first shaft 54, more precisely between the first axial bearing 153 and the drive end 541 of the first shaft 5. Preferably the first radial bearing 154 is configured as hydrodynamic bearing, and even more preferred as a radial tilting pad bearing.

A radial bearing is also referred to as a "journal bearing" and an axial bearing, is also referred to as an "thrust bearing".

Since the pump turbine unit 5 is configured as a process fluid lubricated pump turbine unit 5, both the first axial bearing 153 and the first radial bearing 154 are configured as process fluid lubricated bearing 153, 154, i.e. as bearings that are lubricated and cooled by the process fluid, namely water.

The pump turbine unit 5 further comprises a mechanical seal 155 for sealing the pump turbine unit 5 at the first shaft 54. The mechanical seal 155 is a seal for the rotating first shaft 54. As it is known for mechanical seals as such, the mechanical seal 155 comprises a rotor part (not shown) fixed to the first shaft 54 and rotating with the first shaft 54 as well as a stationary stator part (not shown) fixed with respect to the common housing 3. During operation the rotor part of the mechanical seal 155 and the stator part of the mechanical seal are sliding along each other—usually with a fluid film between the seal faces—for providing a sealing action to prevent the process fluid (water) from escaping from the pump turbine unit 5 along the first shaft 54. The mechanical seal 155 is arranged with respect to the axial direction A between the first radial bearing 154 and the drive end 541 of the first shaft 54.

The pump turbine unit 5 further comprises a balance drum 17 for at least partially balancing the axial thrust that is generated by the impellers 55 during operation of the pump turbine unit 5. The balance drum 17 is fixedly connected to the first shaft 54 and arranged between the plurality of impellers 55 and the first axial bearing 153. The balance drum 17 defines a drum front side 171 and a drum back side 172. The drum front side 171 is the side or the space facing the impellers 55. The drum back side 172 is the side or the space facing the first axial bearing 153 and the first radial bearing 154. The balance drum 17 is surrounded by a first stationary part 126, so that a relief passage 173 is formed between the radially outer surface of the balance drum 17 and the first stationary part 126. The first stationary part 126 is configured to be stationary with respect to the common housing 31. The relief passage 173 forms an annular gap between the outer surface of the balance drum 17 (which is also referred to as a throttle bush in a back-to-back configuration) and the first stationary part 126 and extends from the drum front side 171 to the drum back side 172. The drum front side 171 is in fluid communication with the suction side (referring to the pump mode) of the first impeller 55 of the second set of impellers 55, 55b, which is here the impeller of the fifth stage. Thus, the drum front side 171 is exposed essentially to the pressure of the water prevailing at the exit of the crossover line 134. This is an intermediate pressure which is larger than the suction pressure and smaller than the discharge pressure.

A balance line 19 is provided which extends from a location between the first radial bearing 154 and the mechanical seal 155 to a location at or near the low pressure opening 52, where the suction pressure prevails. Thus, the process side of the mechanical seal 155 is exposed to a pressure which is essentially the same as the suction pressure.

Since the drum front side 171 is exposed essentially to the intermediate pressure prevailing at the exit of the crossover line 134 and the drum back side 172 is exposed to a pressure, that is approximately the same as the suction pressure, a pressure drop exists over the balance drum 17 resulting in a force that is directed upwardly in the axial direction A (according to the representation in FIG. 9) and therewith counteracts the downwardly directed axial thrust generated by the impellers 55a, 55 of the first set of impellers during operation in the pump mode.

The flow passing through the relief passage 173 is guided through the first axial bearing 153 for cooling and lubricating the first axial bearing 153 and then through the first radial bearing 154 for cooling and lubricating the first radial bearing 154. After having passed through the first radial bearing 154, the flow enters the balance line 19, through which the flow is recirculated to the location where the suction pressure prevails.

The supply line 23 for supplying the gas to the second housing 61, which forms here a part of the common housing 31, is connected to the common housing 31 such, that the gas can fill the motor generator unit 6. Referring to the representation in FIG. 9, the entire part of the common housing 31 above the mechanical seal 155, i.e. the part, in which the motor generator unit 6 is arranged, is filled with the gas having the barrier pressure. The mechanical seal 155 seals between the part of the common housing 31 which is filled with the process fluid water and the part of the common housing 31 which is filled with the gas having the barrier pressure. The barrier pressure is adjusted to a value which is larger than the suction pressure. Thus, the process side of the mechanical seal 155 is exposed to the process fluid water having the suction pressure and the other side of the mechanical seal 155 facing away from the process side is exposed to the gas having the barrier pressure. Thus, any leakage through the mechanical seal 155 is always directed towards the process side of the mechanical seal 155. The gas can leak through the mechanical seal 155 into the pump turbine unit 5, but the water cannot pass through the mechanical seal 155 from the process side to the motor generator unit 6. Any leakage of the gas through the mechanical seal 155 will be compensated or replaced from the gas source 24 through the supply line 23.

Optionally, the mechanical seal 155 can also be arranged on the second shaft 62, in particular between the coupling 65 and the lower radial second shaft bearing 144.

Preferably, the barrier pressure is adjusted to a value which is only slightly larger than the suction pressure so that the pressure difference across the mechanical seal 155 is quite small. A small pressure difference over the mechanical seal 155 results in a small leakage through the mechanical seal 155.

Furthermore, the pump turbine unit 5 comprises at least one hydrostatic support device for providing a radial support to the first shaft 54. The hydrostatic support device is preferably configured to provide the support by the Lomakin effect. Different from hydrodynamic radial bearings, which require a rotation of the first shaft 54 to generate the radial bearing forces, a hydrostatic support device does not require a rotation of the first shaft 54 for supporting the first shaft 54 with respect to the radial direction, but a pressure drop across the hydrostatic support device with respect to the axial direction A. As it is known in the art, for example, the Lomakin effect requires a pressure drop along an annular gap for the fluid arranged between the first shaft 54 and a stationary part surrounding the first shaft. The conventional hydrodynamic radial bearing does not require a mentionable pressure drop across the radial bearing, but needs the rotation of the first shaft 54.

The hydrostatic support device comprises a first throttle bush 18, which is fixedly connected to the first shaft 54 between the first stage impeller 55a and the non-drive end 542 of the first shaft 54 or at the non-drive end 542. The first throttle bush 18 defines a first throttle front side 181 and a first throttle back side 182. The first throttle front side 181 is the side or the space facing the first stage impeller 55a. The first throttle back side 182 is the side or the space facing the non-drive end 542 of the first shaft 54. The first throttle bush 18 is surrounded by a first stationary throttle part 127, so that a first throttle passage 183 is formed between the radially outer surface of the first throttle bush 18 and the first stationary throttle part 127. The first stationary throttle part 127 is configured to be stationary with respect to the common housing 31. The first throttle passage 183 forms an annular gap between the outer surface of the first throttle bush 18 and the first stationary throttle part 127 and extends from the first throttle front side 181 to the first throttle back side 182. The first throttle front side 181 is in fluid communication with the low pressure opening 52, so that the axial surface of the first throttle bush 18 facing the first throttle front side 181 is exposed essentially to the suction pressure during pump mode.

The hydrostatic support device further comprises a second throttle bush 185, which is fixedly connected to the first shaft 54 between the first throttle bush 18 and the non-drive end 542 of the first shaft 54 or at the non-drive end 542. The second throttle bush 185 defines a second throttle front side, which is identical with the first throttle back side 182, and a second throttle back side 187, being different from the first throttle back side 182. The second throttle back side 187 is the side or the space facing the non-drive end 542 of the first shaft 54. The second throttle bush 185 is surrounded by a second stationary throttle part 128, so that a second throttle passage 188 is formed between the radially outer surface of the second throttle bush 185 and the second stationary throttle part 128. The second stationary throttle part 128 is configured to be stationary with respect to the common housing 31. The second throttle passage 188 forms an annular gap between the outer surface of the second throttle bush 185 and the second stationary throttle part 128 and extends from the first throttle back side 182 to the second throttle back side 187. The second throttle back side 187 is in fluid communication with a recycle line 191 for recycling the flow of process fluid to a location where the suction pressure prevails during pump mode. Thus, the recycle line 191 is also in fluid communication with the low pressure opening 52 or with any other location, at which the suction pressure prevails during pump mode.

As shown in FIG. 9 it is also possible that the recycle line 191 is connected to the balance line 19.

A feed line 184 is provided, which is configured to supply pressurized water to the first throttle back side 182. The feed line 184 is in fluid communication with a port 193, located at the first throttle back side 182. The feed line 184 is also in fluid communication with an intermediate take-off 194 arranged at a discharge side of the first stage impeller 55a—as shown in FIG. 9—or at a discharge side of any of the intermediate stage impellers 55 or at a discharge side of the last stage impeller 55b.

Since the pressurized water is supplied to the first throttle back side 182, i.e. between the first throttle bush 18 and the second throttle bush 185, the first throttle bush 18 will experience an axial force directed upwards in axial direction A, while the second throttle bush 185 will experience an axial force directed downwards in axial direction A. Therefore, this double throttle bush design has the additional advantage, that the axial forces acting on the first throttle bush 18 and the second throttle bush 185, respectively, compensate each other at least partially.

The feed line 184 connects the intermediate take-off 194 with the port 193, so that during pump mode the pressurized water flows from the intermediate take-off 194 through the port 193 to the first throttle back side 182, i.e. into the space between the first throttle bush 18 and the second throttle bush 185. The flow entering through the port 193 is divided into two partial flows. The first partial flow flows through the first throttle passage 183 to the first throttle front side 181, and the second partial flow flows through the second throttle passage 188 and the recycle line 191 to the suction pressure side at the low pressure opening 52. If the first throttle bush 18 and the second throttle bush 185 have the same dimensions and the first throttle passage 183 and the second throttle passage 188 have the same dimensions the pressure drop over the first throttle bush 18 is essentially the same as the pressure drop over the second throttle bush 185. The first partial flow through the first throttle passage 183 is directed upwardly in the axial direction A and the second partial flow through the second throttle passage 188 is directed downwardly in the axial direction A.

Both partial flows, i.e. the flow through the first throttle passage 183 and the flow through the second throttle passage 188 generate a centering effect on the first shaft 54 due to the Lomakin effect. This centering effect is strong enough so that the hydrostatic support device can replace a journal pump bearing, which is usually provided at the non-drive end 542 of the first shaft 54. Thus, the Lomakin effect generated by the flow through the first throttle passage 183 and the second throttle passage 188 centers and supports the first shaft 54 at the non-drive end 542 with respect to the radial direction.

In other embodiments (see for example FIG. 11) also or alternatively the first radial bearing 154 arranged near the drive end 541 of the first shaft 54 can be replaced with a hydrostatic support device similar or identical with the hydrostatic support device at the non-drive end 542 of the first shaft 54. Thus, it is also possible that the pump turbine unit 5 has no first radial bearings at all (such as a hydrodynamic bearing, a friction bearing, a ball bearing) for supporting the first shaft 54 with respect to the radial direction. The first shaft 54 is then supported with respect to the radial direction only by hydrostatic support devices.

In addition, the flow through the relief passage 173 along the balance drum 17 also causes a centering effect on the first shaft 54 due to the Lomakin effect and thus contributes to support the first shaft 54 with respect to the radial direction.

The flow of the process fluid, namely water, through the pump turbine unit 5 during pump mode is indicated in FIG. 9 by the arrows in dashed lines without reference numeral. Each of the balance line 19, the recycle line 191 and the feed line 184 can be configured as an external line that extends at least partially outside the common housing 31 or as an internal line completely extending within the common housing 31.

As a further balancing device for reducing the overall axial thrust acting on the first shaft 54, a center bush 135 is arranged between the first set of impellers 55a. 55 and the second set of impellers 55, 55b. The center bush 135 is fixedly connected to the first shaft 54 in a torque proof manner and rotates with the first shaft 54. The center bush 135 is arranged on the first shaft 54 between the last stage impeller 55b, which is the last impeller of the second set of impellers 55, 55b, and the intermediate stage impeller 55 of the fourth stage, which is the last impeller of the first set of impellers 55a, 55, when viewed in the direction of increasing pressure during pump mode. The center bush 135 is surrounded by a second stationary part 136 being stationary with respect to the common housing 31. An annular balancing passage 137 is formed between the outer surface of the center bush 135 and the second stationary part 136.

The function of the center bush 135 and the balancing passage 137 is in principle the same as the function of the balance drum 17 and the relief passage 173. At the axial surface of the center bush 135 facing the last stage impeller 55b the discharge pressure prevails during pump mode, and at the other axial surface facing the intermediate impeller 55 of the fourth stage a lower pressure prevails, which is higher than the suction pressure and lower than the discharge pressure, e.g. in the middle between the suction pressure and the discharge pressure. Therefore, the water can pass from the last stage impeller 55b through the balancing passage 137 to the intermediate stage impeller 55 of the fourth stage.

The pressure drop over the center bush 135 results in a force that is directed downwardly in the axial direction A and therewith counteracts the upwardly directed axial thrust generated by the second set of impellers 55, 55b, namely the intermediate stage impellers 55 of the fifth, sixth and seventh stage and the last stage impeller 55b.

The motor generator unit 6 comprises an electric motor 141, the second shaft 62 extending in the axial direction A, and a plurality of second shaft bearings, namely an axial second shaft bearing 143 and two radial second shaft bearings 144. The electric motor 141 comprising the rotor 63 and the stator 64 (see e.g. FIG. 1) can be operated in the generator mode, wherein the second shaft 62 is driven by the first shaft 54 during turbine mode. In the generator mode the rotation of the rotor 63 inside the stator 64 produces electric energy, which is transmitted by the electric power line 66 to the energy unit 67. During the motor mode the electric motor 141 receives electric energy by the electric power line 66 and rotates the second shaft 62 about the axial direction A for driving the first shaft 54 of the pump turbine unit 5 operating in the pump mode.

Referring to the representation in FIG. 9 the axial second shaft bearing 143 and one of the radial second shaft bearings 144 are arranged above the electric motor 141, and the other of the radial second shaft bearings 144 is arranged below the electric motor 141, namely between the electric motor 141 and the coupling 65 with respect to the axial direction A. Preferably, each of the second shaft bearing 143, 144 is configured as a magnetic bearing. The axial second shaft bearing 143 is configured as an active magnetic thrust bearing 143 which is operable in dry running conditions.

The radial second shaft bearings 144 are configured as active magnetic radial bearings 144 which are operable in dry running conditions.

The electric motor 141 of the motor generator unit 6 comprises the inwardly disposed rotor 63 (see e.g. FIG. 1), which is connected to the second shaft 62 in a torque proof manner, as well as the outwardly disposed stator 64 surrounding the rotor 63 with an annular gap between the rotor 63 and the stator 64. The rotor 63 can constitute a part of the second shaft 62 or is a separate part, which is rotationally fixedly connected to the second shaft 62, so that the rotation of the rotor 63 drivers the second shaft 62 (motor mode) or vice versa (generator mode). The electric motor 141 can be configured as a cable wound motor. In a cable wound motor the individual wires of the stator 64, which form the coils for generating the electromagnetic field(s), are each insulated, so that the motor stator 64 can be flooded even with an electrically conducting fluid, e.g. raw seawater. The cable wound motor does not require a dielectric fluid for cooling the stator 64. Alternatively, the electric motor 141 can be configured as a canned motor. When the electric drive 141 is configured as a canned motor, the annular gap between the rotor 63 and the stator 64 is radially outwardly delimited by a can that seals the stator 64 hermetically with respect to the rotor 63 and the gap. Thus, any process fluid flowing through the gap cannot enter the stator 64. When the electric motor 141 is designed as a canned motor the electric motor 141 could be filled even with a liquid. However, according to the disclosure the rotor 63 rotates in the gas providing the barrier pressure. Preferably the entire motor generator unit 6 is filled with the gas at the barrier pressure.

Preferably, the electric motor 141 is configured as a permanent magnet motor or as an induction motor.

The electric motor 141 can be designed to operate with a variable frequency drive (VFD), in which the speed of the drive, i.e. the frequency of the rotation is adjustable by varying the frequency and/or the voltage supplied to the electric motor 141. However, it is also possible that the electric motor 141 is configured differently, for example as a single speed or single frequency drive.

Figure 10:
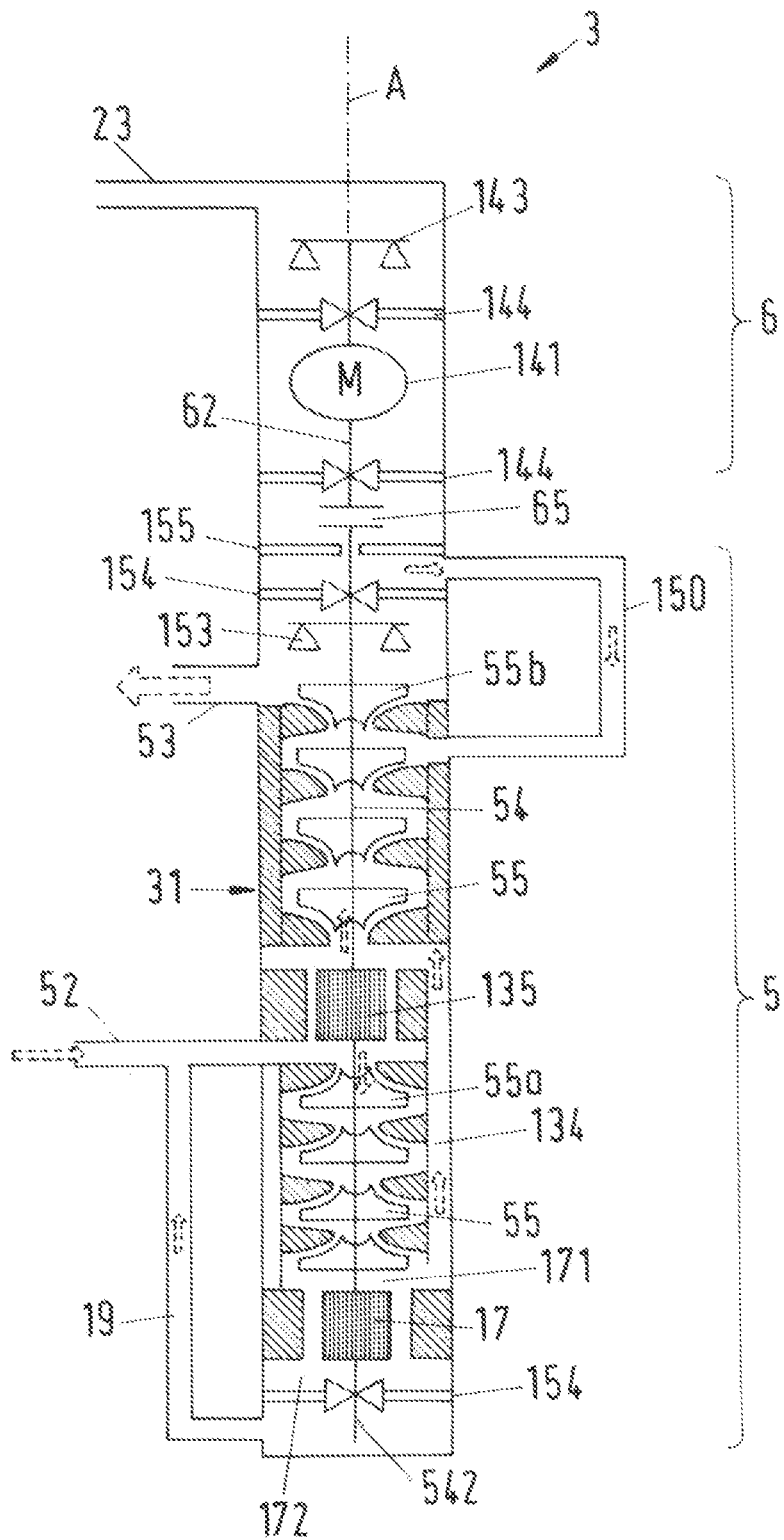

FIG. 10 shows another embodiment of the energy conversion device 3 comprising the motor generator unit 6 and the pump turbine unit 5.

In the following description related to the embodiment shown in FIG. 10 only the differences to the embodiment of the energy conversion device 3 described hereinbefore are explained in more detail. The explanations with respect to the embodiment of the energy conversion device 3 described hereinbefore are also valid in the same way or in analogously the same way for the embodiment shown in FIG. 10. Same reference numerals designate the same features that have been explained hereinbefore or functionally equivalent features.

In this embodiment the pump turbine unit 5 is configured such, that the process side of the mechanical seal 155 for sealing the pump turbine unit 5 at the first shaft 54 is exposed to essentially the same pressure as the pressure prevailing at the high pressure opening 53, namely the discharge pressure which equals the hydrostatic pressure of the water at the high pressure opening 53 and outside of the common housing 31. The barrier pressure prevailing in the motor generator unit 6 is adjusted to a value which is larger than the discharge pressure. Thus, the process side of the mechanical seal 155 is exposed to the process fluid water having essentially the discharge pressure and the other side of the mechanical seal 155, which faces the motor generator unit 6, is exposed to the gas having the barrier pressure. Thus, any leakage through the mechanical seal 155 is always directed towards the process side of the mechanical seal 155. The gas can leak through the mechanical seal 155 into the pump turbine unit 5, but the water cannot pass through the mechanical seal 155 from the process side to the motor generator unit 6. Any leakage of the gas through the mechanical seal 155 will be compensated or replaced from the gas source 24 through the supply line 23.

Preferably, the barrier pressure is adjusted to a value which is only slightly larger than the discharge pressure so that the pressure difference across the mechanical seal 155 is quite small. A small pressure difference over the mechanical seal 155 results in a small leakage through the mechanical seal 155.

Furthermore, since the discharge pressure is given by the hydrostatic pressure of the water at the underwater location, the discharge pressure is constant. Therefore, also the pressure difference across the mechanical seal 155 is constant during pump mode. In particular, the discharge pressure does not dependent on the actual liquid level in the vessel 2, so that the pressure difference across the mechanical seal 155 is constant during the entire pump mode. A constant pressure difference across the mechanical seal 155 is advantageous, because it results in a lower leakage rate—as compared to strong variations in the pressure difference across the mechanical seal.

For exposing the process side of the mechanical seal 155 to the discharge pressure, the balance drum 17 is arranged adjacent to the non-drive end 542 of the second shaft 54 in the embodiment shown in FIG. 10. Instead of the hydrostatic support device an additional first radial bearing 154 for supporting the first shaft 54 with respect to the radial direction is provided near or at the non-drive end 542 of the first shat 54. Also this lower first radial bearing 154 at the non-drive end 542 of the first shaft 54 is configured as a hydrodynamic bearing and as a process fluid lubricated bearing.

Furthermore, the sequence of the impellers 55a, 55, 55b is changed. The last stage impeller 55b is arranged adjacent to the upper first radial bearing 154 and the first axial bearing 153, so that this two bearings 154, 153 are exposed to the discharge pressure. Thus, the water having the discharge pressure passes both through the upper first radial bearing 154 and the first axial bearing 153 to the mechanical seal 155. Of course, there is a minor pressure drop across the upper first radial bearing 154 and the first axial bearing 153, but the pressure prevailing at the process side of the mechanical seal 155 is approximately the same as the discharge pressure.

At the process side of the mechanical seal 155, namely between the first axial bearing 153 and the mechanical seal 155, as an option, a recirculation line 150 is arranged which leads to the suction side of the last stage impeller 55b. The water passing through the upper first radial bearing 154 and the first axial bearing 153 is guided through the recirculation line 150 to the suction side of the last stage impeller 55b. By the recirculation line 150 the flow through the first axial bearing 153 and the upper first radial bearing 154 can be increased. This might be advantageous in view of the lubrication and/or the cooling of said bearings 153, 154.

Since only a small pressure difference is needed to pull the fluid, namely water, through the first axial bearing 153 and the upper first radial bearing 154, it is also possible, for example as an alternative, to provide a plurality of pumping vanes at the first shaft 54 at a location between the upper first radial bearing 154 and the mechanical seal 155. Then the recirculation line 150 can be directly connected to the discharge area, i.e. the region adjacent to the high pressure opening 53 instead of the suction side of the last stage impeller 55b.

The first stage impeller 55a is arranged adjacent to the center bush 135, so that the lower axial face (according to the representation in FIG. 10) of the center bush 135 is exposed to the suction pressure during pump mode.

The balance drum 17 is arranged with respect to the axial direction A between the last intermediate stage impeller 55 of the first set of impellers 55a, 55 and the lower first radial bearing 154. The last intermediate stage impeller 55 of the first set of impellers 55a, 55 is here the intermediate stage impeller 55 of the fourth stage. The pressure side of this intermediate stage impeller 55 is in fluid communication with the crossover line 134 guiding the water to the suction side of the first intermediate stage impeller 55 of the second set of impellers 55, 55b, which is arranged adjacent to the center bush 135.

During pump mode, the water enters the pump turbine unit 5 through the low pressure opening 52 adjacent to the center bush 135, passes downwardly (according to the representation in FIG. 10) through the first set of impellers 55a, 55, namely the first stage impeller 55a and the intermediate stage impellers of the stages two, three and four, passes then through the crossover line 134 to the suction side of the second set of impellers 55, 55b, passes upwardly (according to the representation in FIG. 10) through the second set of impellers 55, 55b, namely the intermediate stage impellers 55 of the stages five, six and seven and the last stage impeller 55b, and is discharged through the high pressure opening 53 to the environment at the underwater location 200.

During pump mode the drum front side 171 of the balance drum 17 is exposed to an intermediate pressure which is larger than the suction pressure and smaller than the discharge pressure. Because of the balance line 19 the drum back side 172 is exposed to a pressure, which is at least approximately the same as the suction pressure. Therefore a pressure difference exists across the balance drum 17 resulting in a force that is directed downwardly in the axial direction A (according to the representation in FIG. 10) and therewith counteracts the upwardly directed axial thrust generated by the impellers 55a, 55 of the first set of impellers.

During pump mode the axial surface of the center bush 135 facing the first stage impeller 55a is exposed to the suction pressure. The axial surface of the center bush 135 facing the first impeller 55 of the second set of impellers 55, 55b, namely the intermediate stage impeller 55 of the fifth stage, is exposed to the intermediate pressure which is larger than the suction pressure and smaller than the discharge pressure. Therefore, a pressure difference exists across the center bush 135 resulting in a force that is directed downwardly in the axial direction A (according to the representation in FIG. 10) and therewith counteracts the upwardly directed axial thrust generated by the impellers 55a, 55 of the first set of impellers.

FIG. 1 shows still another embodiment of the energy conversion device 3 comprising the motor generator unit 6 and the pump turbine unit 5.

In the following description related to the embodiment shown in FIG. 11 only the differences to the embodiments of the energy conversion device 3 described hereinbefore are explained in more detail. The explanations with respect to the embodiments of the energy conversion device 3 described hereinbefore are also valid in the same way or in analogously the same way for the embodiment shown in FIG. 11. Same reference numerals designate the same features that have been explained hereinbefore or functionally equivalent features.

Figure 11:
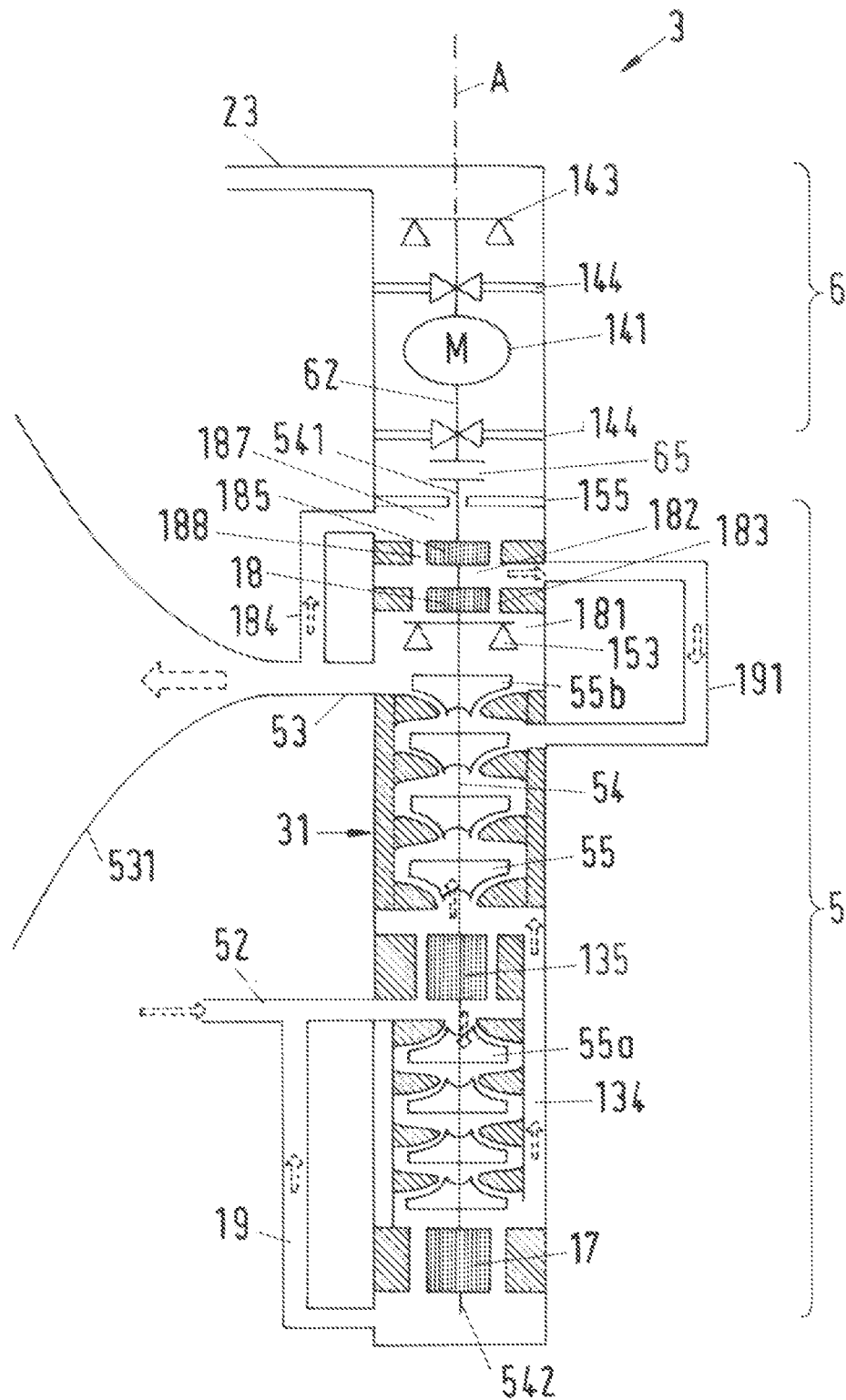

The embodiment shown in FIG. 11 is similar to the embodiment shown in FIG. 10. However, the embodiment shown in FIG. 11 is configured without any conventional first radial bearing 154 for supporting the first shaft 54 with respect to the radial direction. There is no hydrodynamic first radial bearing 154 provided for supporting the first shaft 54 of the pump turbine unit 5 with respect to the radial direction, nor is there any friction bearing or a ball bearing for supporting the first shaft 54 with respect to the radial direction.

The upper first radial bearing 154 of the embodiment shown in FIG. 10 is replaced with a hydrostatic support device having the first throttle bush 18 and the second throttle bush 185, as it has been explained with respect to the embodiment in FIG. 9. Thus, in the embodiment shown in FIG. 11 the first shaft 54 is supported regarding the radial direction at the drive end 541 by the hydrostatic support device comprising the first and the second throttle bush 18, 185. At the non-drive end 542 the first shaft 54 is supported with respect to the radial direction by the balance drum 17, which also functions as a hydrostatic support device.

With respect to the axial direction A the first throttle bush 18 and the second throttle bush 185 of the hydrostatic support device are arranged between the first axial bearing 153 and the mechanical seal 155, wherein the first throttle bush 18 is arranged closer to the first axial bearing 153 and the second throttle bush 185 is arranged between the first throttle bush 18 and the mechanical seal 155.

The first throttle front side 181 faces the first axial bearing 153. During pump mode the first throttle front side 181 is exposed to a pressure, which is at least approximately the same as the discharge pressure. There is a minor pressure drop across the process fluid lubricated first axial bearing 153, but this pressure drop is negligible.

The second throttle back side 187 of the second throttle bush 185 faces the mechanical seal 155. The second throttle back side 187 is in fluid communication with the feed line 184 for feeding the process fluid water to the second throttle back side 187. The feed line 184 is also in fluid communication with the high pressure opening 53, so that the discharge pressure prevails at the second throttle back side 187 during pump mode.

The recycle line 191 is in fluid communication with the first throttle back side 182 and extends to a location, at which a pressure prevails that is lower than the pressure prevailing at the first throttle front side 181. As shown in FIG. 11 the recycle line 191 can be connected to the suction side of the last stage impeller 55b. Thus, during pump mode the first throttle back side 182 is exposed to a pressure which is lower than the pressure at the second throttle back side 187 and lower than the pressure prevailing at the first throttle front side 181.

The feed line 184 connects the high pressure opening 53 with the second throttle back side 187, so that during pump mode the water pressurized to the discharge pressure flows through the feed line 184 to the second throttle back side 187, from where the water flows through the second throttle passage 188 to the first throttle back side 182, i.e. into the space between the first throttle bush 18 and the second throttle bush 185. In addition, the water pressurized to the discharge pressure passes through the first axial bearing 153 and through the first throttle passage 183 to the first throttle back side 182. Thus, the first partial flow flows through the first throttle passage 183 to the first throttle back side 182, and the second partial flow flows through the second throttle passage 188 to the first throttle backside 182. From the first throttle back side 182 the first and the second partial flow are commonly recycled through the recycle line 191. The first partial flow through the first throttle passage 183 is directed upwardly in the axial direction A and the second partial flow through the second throttle passage 188 is directed downwardly in the axial direction A.

Both partial flows, i.e. the flow through the first throttle passage 183 and the flow through the second throttle passage 188 generate a centering effect on the first shaft 54 due to the Lomakin effect. This centering effect is strong enough so that the hydrostatic support device can replace a journal or radial bearing at the drive end 541 of the first shaft 54. Thus, the Lomakin effect generated by the flow through the first throttle passage 183 and the second throttle passage 188 centers and supports the first shaft 54 at the drive end 541 with respect to the radial direction.

As an additional preferred measure the energy conversion device 3 shown in FIG. 11 comprises a discharge cone 531 that is attached to the high pressure opening 53. Similar to a diffuser, the discharge cone 531 is shaped to recover kinetic energy from the water leaving the high pressure opening 53 during pump mode. The discharge cone 531 transforms kinetic energy from the discharged water in potential energy. It goes without saying, that all other embodiments of the energy conversion device 3 can also comprise the discharge cone 531 at the high pressure opening 53.

Optionally, the discharge cone 531 can be arranged at a distance away from the pump turbine unit 5, for example at a certain elevation from the sea ground, in order to avoid the intake of sand or other solid material.

FIG. 12 shows still another embodiment of the energy conversion device 3 comprising the motor generator unit 6 and the pump turbine unit 5.

In the following description related to the embodiment shown in FIG. 12 only the differences to the embodiments of the energy conversion device 3 described hereinbefore are explained in more detail. The explanations with respect to the embodiments of the energy conversion device 3 described hereinbefore are also valid in the same way or in analogously the same way for the embodiment shown in FIG. 12. Same reference numerals designate the same features that have been explained hereinbefore or functionally equivalent features.

The embodiment shown in FIG. 12 is similar to the embodiment shown in FIG. 11. However, in a similar manner as it has been described with respect to FIG. 1, the shaft seal 7 is provided for sealing the motor generator unit 6 at the second shaft 62 and there is no mechanical seal 155 for sealing the pump turbine unit 5 at the first shaft 54.

In the embodiment shown in FIG. 12 the first housing 51 and the second housing 61 can be configured as separate housings which are spaced apart from each other (see e.g. FIG. 1) or the first housing 51 and the second housing 61 form the common housing 31 as it is shown in FIG. 12. In any case the shaft seal 7 separates the "dry" room, which is filled with the gas at the barrier pressure, from the "wet" room which is filled with the process fluid water.

The supply line 23 for supplying the gas is connected to the common housing 31 such, that the gas can fill the electric motor 141 of the motor generator unit 6. Referring to the representation in FIG. 12, the entire part of the common housing 31 above the shaft seal 7, i.e. the part, in which the electric motor 141 of the motor generator unit 6 and the radial second shaft bearings 144 are arranged, is filled with the gas having the barrier pressure. The shaft seal 7 seals between the part of the common housing 31 which is filled with the process fluid water and the part of the common housing 31 which is filled with the gas having the barrier pressure. The coupling 65 and the axial second shaft bearing 143 are located between the second throttle bush 185 of the hydrodynamic support device and the shaft seal 7 and hence are flooded with the process fluid water during operation. The axial second shaft bearing 143 is configured as a process fluid lubricated bearing 143, i.e. as a bearing that is lubricated and cooled by the process fluid, namely water.

Preferably, the shaft seal 7 is configured as a mechanical seal in the same manner as it has been described for the mechanical seal 155.

The feed line 184 opens out into the room, between the second throttle back side 187 of the second throttle bush 185 and the shaft seal 7, where the coupling 65 and the axial second shaft bearing 143 are located. Thus, the process side of the shaft seal 7 is exposed to the process fluid water having essentially the discharge pressure and the other side of the shaft seal 7, which faces the electric motor 141 is exposed to the gas having the barrier pressure. Therefore, also in the embodiment shown in FIG. 12 the barrier pressure is adjusted to be larger than the discharge pressure.

Preferably, the barrier pressure is adjusted to a value which is only slightly larger than the discharge pressure so that the pressure difference across the shaft seal 7 is quite small. A small pressure difference over the shaft seal 7 results in a small leakage through the shaft seal 7.

In the embodiment shown in FIG. 12 the second throttle back side 187 is exposed during pump mode to a pressure which is essentially the same as the discharge pressure when neglecting the pressure drop across the axial second shaft bearing 143.

In the embodiment shown in FIG. 12, the radial second shaft bearings 144 are configured as active magnetic bearings and the axial second shaft bearing 143 is configured as a process fluid lubricated bearing.

FIG. 13 shows still another embodiment of the energy conversion device 3 comprising the motor generator unit 6 and the pump turbine unit 5.

In the following description related to the embodiment shown in FIG. 13 only the differences to the embodiments of the energy conversion device 3 described hereinbefore are explained in more detail. The explanations with respect to the embodiments of the energy conversion device 3 described hereinbefore are also valid in the same way or in analogously the same way for the embodiment shown in FIG. 13. Same reference numerals designate the same features that have been explained hereinbefore or functionally equivalent features.

In the embodiment shown in FIG. 13 the motor generator unit 6 is configured hermetically sealed. The second housing 61 is configured as a hermetically sealed housing, so that no fluid, neither a gas nor a fluid can leave or enter the second housing 61. The second housing 61 can be configured as a separate second housing 61 which is spaced apart from the first housing 51 or the second housing is fixedly connected to the first housing to form the common housing 31. In the last-mentioned case the motor generator unit 6 is hermetically sealed within the common housing 31, so that the gas providing the barrier pressure cannot leave the motor generator unit 6 and the water cannot enter the motor generator unit 6.

For coupling the second shaft 62 with the first shaft 51 the coupling 65 is configured as a magnetic coupling 65, which does not require a physical contact between the first shaft 54 and the second shaft 62.

Since the motor generator unit 6 is configured as a hermetically sealed unit, there is no need for the supply line 23 and for the gas source 24. The second housing 61 is once filled with the gas to the barrier pressure. Since there is no leakage possible, the barrier pressure is maintained inside the second housing 61. For example, the barrier pressure equals at least approximately the discharge pressure.

In the embodiment shown in FIG. 13 all second shaft bearings, i.e. the two radial second shaft bearings 144 and the axial second shaft bearing 143, are configured as active magnetic bearings.

For compensating thermal expansion effects in the motor generator unit 6, for example for compensating thermally induced changes of the barrier pressure, a expansion vessel 26 is provided having a gas side 261 and a liquid side 262 with the gas side 261 separated from the liquid side 262 by a compensation membrane 263. A compensation line 264 is provided connecting the gas side 261 with the interior of the hermetically sealed motor generator unit 6 for a fluid communication between the gas side 261 of the expansion vessel 26 and the motor generator unit 6. Furthermore, the liquid side 262 of the expansion vessel 26 is exposed to the discharge pressure, e.g. by an expansion line 265 providing a fluid communication between the high pressure opening 53 (or any other location, where the discharge pressure prevails) and the liquid side 262 of the expansion vessel 26.

Thus, the compensation membrane 263 is loaded at the liquid side 262 with the discharge pressure. The discharge pressure is transferred by the compensation membrane 263 to the gas side 261, so that at the gas side and in the motor generator unit 6 the barrier pressure is maintained.

FIG. 14 shows still another embodiment of the energy conversion device 3 comprising the motor generator unit 6 and the pump turbine unit 5.

In the following description related to the embodiment shown in FIG. 14 only the differences to the embodiments of the energy conversion device 3 described hereinbefore are explained in more detail. The explanations with respect to the embodiments of the energy conversion device 3 described hereinbefore are also valid in the same way or in analogously the same way for the embodiment shown in FIG. 14. Same reference numerals designate the same features that have been explained hereinbefore or functionally equivalent features.

The embodiment shown in FIG. 14 is particularly suited for the first embodiment of the energy storage system 1 (FIG. 1) or for the second embodiment of an energy storage system 1 (FIG. 2), where the second housing 61, in which the motor generator unit 6 is arranged, is configured as a separate housing which is spaced apart from the first housing 51, in which the pump turbine unit 5 is arranged. The second housing 61 can be arranged in the pressure chamber 9 as shown in FIG. 2, or there is no pressure chamber 9 provided as it is shown in FIG. 1.

The supply line 23 for supplying the gas to the second housing 61 is connected to the interior of the second housing 61 and extends to the gas source 24, which is located at or above the water surface 100. The gas source 24 is configured to supply the gas with the barrier pressure via the supply line 23 to the interior of the second housing 61, so that the second housing 61 is pressurized to the barrier pressure by the gas.

The shaft seal 7 is provided at the second housing 61 for sealing the second housing 61 at the second shaft 62. The second shaft 62 extends through the second housing 61 to the exterior of the second housing 61 to the coupling 65, where the second shaft 62 is coupled to the first shaft 54. Thus, the coupling 65 is preferably arranged outside the second housing 61. The shaft seal 7 is preferably configured as a mechanical seal and seals the interior of the second housing 61 against the environment at the underwater location 200. The barrier pressure is adjust such that it is at least slightly larger than the hydrostatic pressure of the water at the underwater location 200 acting on the shaft seal 7. Said hydrostatic pressure constitutes the discharge pressure at the high pressure opening 53 during pump mode. Thus, water entering the second housing 61 is prevented. Since the barrier pressure prevailing inside the second housing 61 is larger than the environmental pressure prevailing at the outside of the second housing 61 any leakage through the shaft seal 7 is always directed from the interior of the second housing 61 to the exterior of the second housing 61. The gas can leak from the second housing 61 through the shaft seal 7 to the environment, but the water cannot leak through the shaft seal 7 into the second housing 61. Thus, the water is reliably prevented from entering the second housing 61 filled with the gas. The amount of gas leaking through the shaft seal 7 is replaced by the gas source 24 through the supply line 23.

In the embodiment shown in FIG. 14 all second shaft bearings, i.e. the two radial second shaft bearings 144 and the axial second shaft bearing 143, are configured as active magnetic bearings and arranged inside the second housing 61

The pump turbine unit 5 of the embodiment shown in FIG. 14 is configured in a similar way as in the embodiment shown in FIG. 10. However, in the embodiment shown in FIG. 14 there is no recirculation line 150 and the mechanical seal 155 is replaced by an exit throttle bush 88 to limit the flow of water along the first shaft 54.

During pump mode, the water will most likely exit the pump turbine unit 5 along the exit throttle bush 88, and during generator mode the water will most likely get sucked into the pump turbine unit 5 through the exit throttle bush 88. The exit throttle bush 88 is configured with quite large gap. If a unidirectional flow of water is desired, a pumping scroll or a plurality of pumping vanes can be provided at the first shaft 54 at a location between the upper first radial bearing 154 and the exit throttle bush 88, so that the water will always be exiting the pump turbine unit 5 through the exit throttle bush 88 during operation.

Pumping vanes could be also be provided at the center bush 135, preferably only at one side of the center bush, namely the downward facing side of the center bush according to the representation in FIG. 14.

It has to be understood that the particular measures and configurations described hereinbefore and in particular referring to the embodiments shown in FIG. 9-FIG. 14 can be combined also in different ways.

What is claimed is:

1. An energy storage system for installation at an underwater location, comprising:
    a vessel configured to store water;
    an energy conversion device configured to selectively convert energy between potential energy and electric energy;
    a connection line connecting the vessel with the energy conversion device, the energy conversion device comprising a first housing, a second housing, a pump turbine unit arranged in the first housing, and a motor generator unit arranged in the second housing, the first housing comprising a low pressure opening and a high pressure opening for the water the pump turbine unit comprising a first shaft configured to rotate about an axial direction, and at least one impeller mounted on the first shaft configured to interact with the water, the motor generator unit comprising a second shaft configured to rotate about the axial direction, and a rotor at the second shaft configured to rotate relative to a stator, the second shaft coupled to the first shaft to transmit a torque between the first shaft and the second shaft, and the connecting line configured to connect the low pressure opening with an opening provided at the vessel for receiving the water from the vessel or discharging the water into the vessel, and the second housing being filled with a gas to provide a barrier pressure during operation of the energy conversion device, such that the rotor rotates within the gas; and a supply line to supply the gas to the underwater location, the gas providing the barrier pressure during operation of the energy conversion device.

2. The energy storage system in accordance with claim 1, further comprising a shaft seal to seal the second housing at the first shaft or at the second shaft.

3. The energy storage system in accordance with claim 1, further comprising a pressure chamber configured to be filled with the gas to provide the barrier pressure during operation of the energy conversion device, and the motor generator unit is arranged inside the pressure chamber.

4. The energy storage system in accordance with claim 3, wherein the pump turbine unit is arranged inside the pressure chamber.

5. The energy storage system in accordance with claim 1, wherein the first housing and the second housing are fixedly connected to each other to form a common housing of the energy conversion device.

6. The energy storage system in accordance with claim 1, further comprising a hydraulic cylinder to pressurize the gas to the barrier pressure, the hydraulic cylinder comprises a liquid chamber and a gas chamber, the liquid chamber and the gas chamber are separated by a movable piston, the piston being loaded with the hydrostatic pressure of the water in the vessel on an upper face of the piston facing the liquid chamber, and the gas chamber is in fluid communication with an inside of the second housing.

7. The energy storage system in accordance with claim 6, wherein the hydraulic cylinder is arranged and configured to generate the barrier pressure, and the barrier pressure is at least as large as a suction pressure prevailing at the low pressure opening.

8. The energy storage system in accordance with claim 3, wherein the pressure chamber is delimited by a diaphragm, the diaphragm configured to pressurize the gas in the pressure chamber due to the hydrostatic pressure of the water prevailing at the underwater location.

9. The energy storage system in accordance with claim 1, further comprising a hydraulic accumulator configured to pressurize the gas to the barrier pressure, the hydraulic accumulator being located at an accumulator location, and the hydraulic accumulator comprises a liquid side and a gas side separated by a flexible membrane, the membrane being loaded at the liquid side with the hydrostatic pressure of the water prevailing at the accumulator location, and the gas side of the hydraulic accumulator is in fluid communication with an inside of the second housing.

10. The energy storage system in accordance with claim 9, wherein the hydraulic accumulator is arranged and configured to generate the barrier pressure, and the barrier pressure is larger than a discharge pressure prevailing at the high pressure opening of the energy conversion device.

11. The energy storage system in accordance with claim 1, wherein the pump turbine unit comprises a mechanical seal to seal the pump turbine unit at the first shaft, and the mechanical seal is exposed essentially to a same pressure that prevails at the high pressure opening of the energy conversion device.

12. The energy storage system in accordance with claim 1, wherein the motor generator unit is hermetically sealed, and a magnetic coupling provided to couple the first shaft and the second shaft.

13. The energy storage system in accordance with claim 1, wherein the motor generator unit comprises a plurality of second shaft bearings to support the second shaft, with each shaft bearing of the plurality of second shaft bearings being a magnetic bearing.

14. The energy storage system in accordance with claim 1, wherein the pump turbine unit comprises at least one first shaft bearing to support the first shaft, and each first shaft bearing of the plurality of first shaft bearings is a product lubricated bearing.

15. The energy storage system in accordance with claim 3, further comprising a hydraulic cylinder to pressurize the gas to the barrier pressure, the hydraulic cylinder comprises a liquid chamber and a gas chamber, the liquid chamber and the gas chamber are separated by a movable piston, the piston being loaded with the hydrostatic pressure of the water in the vessel on an upper face of the piston facing the liquid chamber, and the gas chamber is in fluid communication with an inside of the second housing or with an inside of the pressure chamber.

16. The energy storage system in accordance with claim 3, further comprising a hydraulic accumulator configured to pressurize the gas to the barrier pressure, the hydraulic accumulator being located at an accumulator location, and the hydraulic accumulator comprises a liquid side and a gas side separated by a flexible membrane, the membrane being loaded at the liquid side with the hydrostatic pressure of the water prevailing at the accumulator location, and the gas side of the hydraulic accumulator is in fluid communication with an inside of the second housing or with an inside of the pressure chamber.

* * * * *